United States Patent
Zhang et al.

(10) Patent No.: US 11,539,607 B2
(45) Date of Patent: *Dec. 27, 2022

(54) DETECTION BLOCK SENDING AND RECEIVING METHOD, AND NETWORK DEVICE AND SYSTEM

(71) Applicant: HUAWEI TECHNOLOGIES CO., LTD., Guangdong (CN)

(72) Inventors: Xiaojun Zhang, Shenzhen (CN); Lehong Niu, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,731

(22) Filed: Aug. 2, 2021

(65) Prior Publication Data

US 2021/0367869 A1     Nov. 25, 2021

Related U.S. Application Data

(63) Continuation of application No. 16/745,937, filed on Jan. 17, 2020, now Pat. No. 11,082,317, which is a (Continued)

(30) Foreign Application Priority Data

Jul. 18, 2017   (CN) ........................ 201710586112.3
Aug. 11, 2017   (CN) ........................ 201710687162.0

(51) Int. Cl.
*G06F 15/173*    (2006.01)
*H04L 43/0829*    (2022.01)
(Continued)

(52) U.S. Cl.
CPC ........ *H04L 43/0829* (2013.01); *H04L 1/0061* (2013.01); *H04L 1/0067* (2013.01);
(Continued)

(58) Field of Classification Search
CPC ....... H04L 1/0061; H04L 1/0067; H04L 1/20; H04L 41/06; H04L 41/0627;
(Continued)

(56) References Cited

U.S. PATENT DOCUMENTS 5,799,003 A * 8/1998 Fujimaki ............ H04Q 11/0478
370/244
6,831,920 B1   12/2004 Uchida
(Continued)

FOREIGN PATENT DOCUMENTS

CN      1450819     10/2003
CN      1659064      8/2005
(Continued)

OTHER PUBLICATIONS

Extended European Search Report issued in European Application No. 18835529.1 dated Mar. 17, 2020, 8 pages.
(Continued)

*Primary Examiner* — Richard G Keehn
(74) *Attorney, Agent, or Firm* — Fish & Richardson P.C.

(57) ABSTRACT

This application provides example detection block sending and receiving methods, and network devices and systems. One example detection block sending method includes obtaining, by a network device, an original bit block data flow. At least one detection block is generated, and the at least one detection block is inserted into a position of at least one idle block in the original bit block data flow. The bit block data flow including the at least one detection block is then sent.

20 Claims, 32 Drawing Sheets

Related U.S. Application Data continuation of application No. PCT/CN2018/093563, filed on Jun. 29, 2018.

(51) Int. Cl.

| | |
|---|---|
| H04L 41/0604 | (2022.01) |
| H04L 41/0631 | (2022.01) |
| H04L 41/0659 | (2022.01) |
| H04L 43/0817 | (2022.01) |
| H04L 43/0876 | (2022.01) |
| H04L 69/22 | (2022.01) |
| H04L 43/0811 | (2022.01) |
| H04L 1/00 | (2006.01) |
| H04L 43/0852 | (2022.01) |
| H04L 47/10 | (2022.01) |
| H04L 43/0823 | (2022.01) |
| H04L 41/06 | (2022.01) |
| H04L 1/20 | (2006.01) |

(52) U.S. Cl.
CPC ............... *H04L 1/20* (2013.01); *H04L 41/06* (2013.01); *H04L 41/0627* (2013.01); *H04L 41/0645* (2013.01); *H04L 41/0659* (2013.01); *H04L 43/0811* (2013.01); *H04L 43/0817* (2013.01); *H04L 43/0847* (2013.01); *H04L 43/0852* (2013.01); *H04L 43/0876* (2013.01); *H04L 47/23* (2013.01); *H04L 69/22* (2013.01)

(58) Field of Classification Search
CPC ............ H04L 41/0645; H04L 41/0659; H04L 43/0811; H04L 43/0829; H04L 43/0817; H04L 43/0847; H04L 43/0852; H04L 43/0876; H04L 47/23; H04L 47/2483; H04L 69/22

See application file for complete search history.

(56) References Cited

U.S. PATENT DOCUMENTS

| | | | | |
|---|---|---|---|---|
| 11,121,907 | B2 * | 9/2021 | Huang | H04L 41/06 |
| 2003/0192004 | A1 * | 10/2003 | Gopalakrishnan | H04L 1/0072 |
| | | | | 714/758 |
| 2005/0102419 | A1 * | 5/2005 | Popescu | H04L 43/00 |
| | | | | 709/238 |
| 2008/0225965 | A1 * | 9/2008 | Pi | H04L 25/0204 |
| | | | | 714/800 |
| 2009/0010595 | A1 | 1/2009 | Robinson et al. | |
| 2009/0323722 | A1 | 12/2009 | Sharma | |
| 2011/0058807 | A1 | 3/2011 | Suzuki et al. | |
| 2011/0085465 | A1 | 4/2011 | Lindoff et al. | |
| 2013/0010600 | A1 * | 1/2013 | Jocha | H04L 43/062 |
| | | | | 370/236.2 |
| 2013/0182559 | A1 * | 7/2013 | Fujioka | H04L 41/0668 |
| | | | | 370/218 |
| 2015/0188571 | A1 * | 7/2015 | Loewenstein | H03M 13/2906 |
| | | | | 714/785 |
| 2016/0094327 | A1 * | 3/2016 | Han | H04L 1/0073 |
| | | | | 370/329 |
| 2017/0005901 | A1 | 1/2017 | Gareau | |
| 2018/0115326 | A1 * | 4/2018 | Aharony | H03M 13/3707 |

FOREIGN PATENT DOCUMENTS

| | | | | |
|---|---|---|---|---|
| CN | 1835459 | | 9/2006 | |
| CN | 101552687 | | 10/2009 | |
| CN | 102057729 | | 5/2011 | |
| CN | 106484323 | | 3/2017 | |
| EP | 3089423 | | 11/2016 | |
| EP | 3089423 | A1 * | 11/2016 | ............ H04J 3/1652 |
| EP | 3113502 | | 1/2017 | |
| EP | 3113502 | A1 * | 1/2017 | ............ G06F 13/40 |
| JP | 2002223245 | | 8/2002 | |
| JP | 2009060446 | A | 3/2009 | |
| JP | 2018046373 | A | 3/2018 | |
| JP | 2018523409 | A | 8/2018 | |
| JP | 2018526866 | A | 9/2018 | |
| WO | 2015149523 | A1 | 10/2015 | |

OTHER PUBLICATIONS

IEEE Std 802.3-2015, IEEE Standard for Ethernet, IEEE Computer Society, Sponsored by the LAN/MAN Standards Committee, Approved Sep. 3, 2015, 4017 pages.

James Huang(Huawei), "Ultra-Low Latency Ethernet, Ethernet Everywhere", Dec. 2016, retrieved from: URL <https://www.itu.int/en/ITU-T/Workshops-and-seminars/201612/Documents/slides/14-Huawei-X-Ethernet.pdf>, 11 pages.

Office Action issued in Chinese Application No. 201710687162.0 dated Mar. 3, 2021, 28 pages (with English translation).

Office Action issued in Japanese Application No. 2020-502384 dated Mar. 9, 2021, 7 pages (with English translation).

Optical Internetworking Forum, "Flex Ethernet Implementation Agreement", IA # OIF-FLEXE-01.0, XP055509044, Mar. 2016, 31 pages.

PCT International Search Report and Written Opinion in International Application No. PCT/CN2018/093/563, dated Sep. 12, 2018, 17 pages (With English Translation).

Office Action issued in Chinese Application No. 201710687162.0 dated Oct. 15, 2021, 6 pages.

Office Action issued in Japanese Application No. 2020-502384 dated Nov. 9, 2021, 5 pages (with English translation).

* cited by examiner

| 0 0 0 | | ... | | | | | 6 6 |
|---|---|---|---|---|---|---|---|
| 0 1 2 | | ... | | | | | 4 5 |

| 1 | 0 | 0x4B | 0x023 (ID) | 0x400 (T) | 0X6 | 0X00 | 0X00 | 0X00 | 0X0 |
|---|---|------|------------|-----------|-----|------|------|------|-----|

FIG. 7b

| 0 0 0 | | ... | | | | | 6 6 |
|---|---|---|---|---|---|---|---|
| 0 1 2 | | ... | | | | | 4 5 |

| 1 | 0 | 0x4B | 0x23 (ID-1) | 0x400 (T) | 0X6 | 0X00 | 0X00 | 0X00 | 0X0 |
|---|---|------|-------------|-----------|-----|------|------|------|-----|

| 1 | 0 | 0x4B | 0x45 (ID-2) | 0x400 (T) | 0X6 | 0X00 | 0X00 | 0X00 | 0X0 |
|---|---|------|-------------|-----------|-----|------|------|------|-----|

...

| 1 | 0 | 0x4B | 0x88 (ID-n) | 0x400 (T) | 0X6 | 0X00 | 0X00 | 0X00 | 0X0 |
|---|---|------|-------------|-----------|-----|------|------|------|-----|

FIG. 7c

| 0 0 0 | | ... | | | | | 6 6 |
|---|---|---|---|---|---|---|---|
| 0 1 2 | | ... | | | | | 4 5 |

| 1 | 0 | 0x00 | D1 | D2 | D3 | D4 | D5 | D6 | D7 |
|---|---|------|----|----|----|----|----|----|----|

↓ Type field

FIG. 7d

| 0 0 0 | | 6 6 |
| 0 1 2 | ... | 4 5 |
| 1 | 0 | 0x00 | 0x023 (ID) | 0x400 (T) |

FIG. 7e

| 0 0 0 | | 6 6 |
| 0 1 2 | | 4 5 |
| 1 | 0 | 0x00 | 0x23 (ID-1) | 0x400 (T) |

| 1 | 0 | 0x00 | 0x45 (ID-2) | 0x400 (T) |

...

| 1 | 0 | 0x00 | 0x88 (ID-n) | 0x400 (T) |

FIG. 7f

| 0 0 0 | | | | | | | | | 6 6 |
| 0 1 2 | | | | | | | | | 4 5 |
| 1 | 0 | 0x4B | 0x01 | 0 | 0x23 | 0X6 | 0X00 | 0X00 | 0X00 | 0X0 |

| 1 | 0 | 0x4B | 0x01 | 1 | 0x45 | 0X6 | 0X00 | 0X00 | 0X00 | 0X0 |

...

| 1 | 0 | 0x4B | 0x01 | 63 | 0x88 | 0X6 | 0X00 | 0X00 | 0X00 | 0X0 |

FIG. 7g

| 1 | 0 | 0x1E | /1/(0X00) | /1/(0X00) | /1/(0X00) | /1/(0X00) | /1/(0X00) | ... | /1/(0X00) | /1/(0X00) | /1/(0X00) |
|---|---|------|-----------|-----------|-----------|-----------|-----------|-----|-----------|-----------|-----------|
| 0 | 0 |      |           |           |           |           |           |     |           |           |           |
| 0 | 1 |      |           |           |           |           |           |     |           |           |           |
| 0 | 2 |      |           |           |           |           |           |     |           |           | 6 6       |
|   |   |      |           |           |           |           |           |     |           |           | 4 5       |

FIG. 11

| Type | Length (bit) | Value | Mode |
|---|---|---|---|
| CS | 4 | 0000: UNEQ<br>0001: SDH service<br>0010: FC service<br>0011: CPRI service<br>0100: Ethernet service<br>0101: PRBS test signal<br>0110 to 1110 Reserved<br>1111: CSF | Periodic sending (relatively long) |
| BIP | 8 | BIP-8 | Periodic sending (relatively long) |
| REI | 4 | Remote error indication | On-demand sending |
| RDI/AIS | 2 | 00/11: Normal<br>01: Remote defect indication<br>10: AIS | On-demand sending |
| CCB | 16 | Flow identifier | Periodic sending (relatively long) |
| APS | 4 | APS | On-demand sending |
| DM | 8 | Delay measurement | On-demand sending |
| TCM | 8 | Tandem connection monitor | On-demand sending |

CONT. FROM FIG. 18aA

FIG. 18aB

| Type | Length | Value | Mode |
|---|---|---|---|
| 1: CS/VER [0b00000] | 4 | CS: D1[6:7]+D2[0:1]<br>0000: UNEQ<br>0001: SDH service<br>0010: FC service<br>0011: CPRI service<br>0100: Ethernet service<br>0101: PRBS test signal<br>0110: RCSF-Remote Client Service Fault<br>1111: CSF-Client Service Fault<br>VER: D2[2:4]<br>0 to 7 indicate different versions, 0 is a first version | Periodic sending |
| 2: BIP/REI [0b00001] | 14 | BIP-8 result: D1[6:7]+D2[0:5]<br>D2[6:7] = 0b00 Reserved<br>FlexBIP-9 result: D1[6:7] + D2[0:6]<br>D2[7] = 0b0 Reserved<br>D3[0:3]: Remote error block count indication<br>D1[6:7] | Periodic sending |
| 3: RDI/AIS [0b00001] | 2 | 00/11: Normal<br>01: Remote defect indication<br>10: AIS | On-demand sending |
| 4: Connect [0b00010] | 14 | CC: No attention<br>D1[6:7] + D2[0:7] + D3[0:3] coding:<br>CV:<br>D1[6:7] + D2[0:3]: a numbering range 0 to 63 of a byte in a TTI;<br>D2[4:7] + D3[0:3]: one TTI byte<br>D1[6:7]+D2[0:1] | On-demand sending |
| 5: APS [0b00010] | 4 | APS<br>D1[6:7] | On-demand sending |
| 6: DM [0b00011] | 14 | 0b01 2DM trigger sending<br>0b10 2DM loopback sending<br>0b00 1DM first frame bit [1 to 11]/third frame bit [24 to 35]/fifth frame bit [48 to 59]/seventh frame bit [72 to 83]<br>0b11 second frame bit[12 to 23]/fourth frame bit[36-47]/sixth frame bit[60 to 71]/eighth frame bit [84 to 95]<br>D2[0:7]+D3[0:3]<br>2DM: trigger sending, 0b00000000000<br>2DM: loopback sending, a sending delay from receiving DM [D1 (0b01)] to sending DM [D1 (0b10)], in a unit of 100/500 ns;<br>1DM: first frame; second frame to eighth frame (optional);<br>Accuracy may be defined from 12 bits to 96 bits.<br>Connection delay measurement | On-demand sending |

DETECTION BLOCK SENDING AND RECEIVING METHOD, AND NETWORK DEVICE AND SYSTEM

CROSS-REFERENCE TO RELATED APPLICATIONS

This application is a continuation of U.S. patent application Ser. No. 16/745,937, filed on Jan. 17, 2020, now U.S. Pat. No. 11,082,317, which is a continuation of International Application No. PCT/CN2018/093563, filed on Jun. 29, 2018. The International Application claims priority to Chinese Patent Application No. 201710687162.0, filed on Aug. 11, 2017 and Chinese Patent Application No. 201710586112.3, filed on Jul. 18, 2017. All of the aforementioned patent applications are hereby incorporated by reference in their entireties.

TECHNICAL FIELD

This application relates to the communications field, and in particular, to a detection block sending and receiving method, and a network device and system.

BACKGROUND

Currently, a Flexible Ethernet Implementation Agreement (Flex Ethernet implementation agreement 1.0, FlexE IA 1.0) interface technology has been standardized at the Optical Internetworking Forum (optical internetworking forum, OIF). A flexible Ethernet (Flex Ethernet, FlexE) interface technology may be applied to data center device interconnection and the like. A plurality of FlexE client services at different rates are transferred by binding n 100G physical layer (physical layer device, PHY) devices. Subsequently, the FlexE further defines a switching technology: a Layer 1.5 switching technology, which is also referred to as an X-Ethernet switching technology or an X-E switching technology. The Layer 1.5 switching technology (namely, the X-Ethernet switching technology or the X-E switching technology) is a bit block (such as a 64 B/66 B bit block) switching technology based on an Ethernet (Ethernet) physical layer, and has a technical feature of a deterministic ultra-low delay.

FIG. 1 is a schematic diagram of a networking architecture using a Layer 1.5 switching technology according to the prior art. As shown in FIG. 1, a path indicated by a dashed line is an end-to-end service forwarding path. In the prior art, Layer 1.5 end-to-end fault detection is performed by inserting a detection block at a fixed period, for example, by inserting a detection block every N bit blocks. First, a detection block is inserted into an upstream client signal adaptation unit, and an overhead block is inserted into a downstream network signal adaptation unit. The insertion of the two bit blocks leads to rise of a watermark in the network signal adaptation unit, and an idle block needs to be deleted. Inserting the detection block by using the technical solution in the prior art causes the downstream watermark to fluctuate. Therefore, deletion of an idle block is triggered, to reduce watermark fluctuations caused by insertion of the detection block. Once a processing line is relatively long or there are many processing steps, watermark overflow occurs, resulting in a service bit block loss.

SUMMARY

In view of this, this application provides a detection block sending and receiving method, and a network device and system, so as to resolve a problem of a service bit block loss in a detection block sending process.

According to a first aspect, this application provides a detection block sending method, including: obtaining, by a network device, an original bit block data flow; generating at least one detection block, and inserting the at least one detection block into a position of at least one idle block in the original bit block data flow; and sending a bit block data flow including the at least one detection block.

In this application, a bandwidth resource of the idle block in the bit block data flow is occupied for sending the detection block, thereby resolving a problem of a service bit block loss.

In a possible implementation, the inserting the at least one detection block into a position of at least one idle block in the original bit block data flow includes: inserting X detection blocks into positions of X idle blocks in the original bit block data flow, where X is a positive integer greater than or equal to 1. Optionally, according to the Institute of Electrical and Electronics Engineers (Institute of Electrical and Electronics Engineers, IEEE) 802.3 standard, a detection block is not inserted into a packet but inserted between two packets, to ensure packet integrity.

In this application, a quantity of inserted detection blocks is equal to a quantity of substituted idle blocks, and the detection blocks completely occupy bandwidth resources of the idle blocks for sending. This has no impact on service bandwidth, thereby resolving a problem of a service bit block loss.

In a possible implementation, the at least one detection block carries a flow identifier, and the flow identifier is used to indicate a connection identifier of the original bit block data flow. A standard such as ITU-T G709 specifies that information identifying such connection is a trail trace identifier (trail trace identifier, TTI for short). The flow identifier in this specification and the TTI have a same meaning, and for brevity, the flow identifier is used in this specification. In addition, a required length of the flow identifier may be defined based on user requirements. When the length is relatively long, the flow identifier may be carried in a plurality of detection blocks that are sent in sequence. In other words, several detection blocks separately carry a portion of the flow identifier, and a receiver receives a plurality of detection blocks and then combines a plurality of portions into the complete identifier.

In this application, the flow identifier is carried in the detection block, so that a receive end may determine, based on the flow identifier, whether there is a misconnection. The misconnection is also referred to as a trail trace identifier TTI mismatch (TIM for short). A flow identifier mismatch described in this specification is the TIM. When the flow identifier needs to be carried in the plurality of detection blocks that are sent in sequence, the receiver can determine whether there is a mismatch only after receiving the plurality of detection blocks and combining the plurality of portions into the complete flow identifier.

In a possible implementation, the at least one detection block further carries a type identifier, and the type identifier may indicate a type of a function of the detection block. For example, the detection block may be used for connectivity check. The detection block may alternatively be used for other OAM function detection such as bit interleaved parity (BIP), a remote error indication (RET), a client signal indication (CS), synchronization (SYNC), an alarm indication (AIS) at a service layer, a protection switching protocol (APS), and delay measurement (DM).

In a possible implementation, the at least one detection block can flexibly select whether to carry a preset reference sending period, and the preset reference sending period is used to indicate a sending period of the at least one detection block.

In a possible implementation, the sending period of the at least one detection block is greater than or equal to the preset reference sending period carried in the at least one detection block.

In this application, the sending period of the detection block may vary within a specific range and is a non-fixed period.

In a possible implementation, when the sending period of the at least one detection block is greater than the preset reference sending period carried in the at least one detection block, the method further includes: updating the preset reference sending period of the at least one detection block to the sending period of the at least one detection block.

In this application, the preset reference sending period may dynamically change with an actual sending period of the detection block.

In a possible implementation, the at least one detection block is an M/N bit block. The detection block may be a coded bit block such as a 64 B/66 B bit block, an 8 B/10 B bit block, or a 256 B/257 B bit block, or may be an uncoded bit block.

In a possible implementation, an idle block is added to and/or deleted from the bit block data flow, so that a rate of a bit block data flow to and/from which the idle block is added and/or deleted is adapted to a port rate of the network device. For example, an idle block may be added to and/or deleted from the original bit block data flow, or an idle block may be added to and/or deleted from the bit block data flow into which the detection block is inserted.

According to a second aspect, this application provides a service receiving method, including: receiving, by a network device, a bit block data flow including at least one detection block; identifying the at least one detection block, and substituting at least one idle block for the at least one detection block; and sending a bit block data flow obtained after the at least one idle block is substituted.

In this application, a bandwidth resource of the idle block in the bit block data flow is occupied for receiving the detection block, thereby resolving a problem of a service bit block loss.

In a possible implementation, the substituting at least one idle block for the at least one detection block includes: substituting X idle blocks for X detection blocks, where X is a positive integer greater than or equal to 1.

In this application, a quantity of received detection blocks is equal to a quantity of substituted idle blocks, and the detection blocks completely occupy bandwidth resources of the idle blocks for receiving. This has no impact on service bandwidth, thereby resolving a problem of a service bit block loss.

In a possible implementation, the detection block carries a flow identifier, the flow identifier is used to indicate a connection identifier of the bit block data flow, and the method further includes: performing, by the network device, fault detection based on the flow identifier.

In this application, the flow identifier is carried in the detection block, and the network device at a receive end may determine, based on the flow identifier, whether there is a misconnection, so as to quickly and efficiently detect a connection fault. When the flow identifier needs to be carried in a plurality of detection blocks that are sent in sequence, a receiver can determine whether there is a mismatch only after receiving the plurality of detection blocks and combining a plurality of portions into the complete flow identifier.

In a possible implementation, the at least one detection block further carries a type identifier, and the type identifier may indicate a type of a function of the detection block. For example, the detection block may be used for connectivity check. The detection block may alternatively be used for other OAM function detection such as bit interleaved parity (BIP), a remote error indication (REI), a client signal indication (CS), synchronization (SYNC), an alarm indication (AIS) at a service layer, a protection switching protocol (APS), and delay measurement (DM). When the type identifier is carried in the detection block, the network device at the receive end may further identify the type of the function of the detection block based on the type identifier.

In a possible implementation, the detection block carries a preset reference sending period, and the method further includes, identifying, by the network device, the at least one detection block based on the reference sending period.

The preset reference sending period is carrying in the detection block, so that the network device at the receive end can quickly locate the detection block. When the detection block does not carry the preset reference sending period, the network device at the receive end quickly locates the detection block based on a local preset period.

In a possible implementation, the at least one detection block is an M/N bit block. The detection block may be a coded bit block such as a 64 B/66 B bit block, an 8 B/10 B bit block, or a 256 B/257 B bit block, or may be an uncoded bit block.

According to a third aspect, this application provides a network device. The network device is configured to implement a function in any of the first aspect or the possible implementations of the first aspect. The function may be implemented by hardware, or may be implemented by hardware executing corresponding software. The hardware or the software includes one or more modules corresponding to the function.

According to a fourth aspect, this application provides a network device. The network device is configured to implement a function in any of the second aspect or the possible implementations of the second aspect. The function may be implemented by hardware, or may be implemented by hardware executing corresponding software. The hardware or the software includes one or more modules corresponding to the function.

According to a fifth aspect, an embodiment of the present invention provides a network system, including the network device according to the third aspect and the network device according to the fourth aspect or the fourth aspect.

Another aspect of this application provides a computer readable storage medium. The computer readable storage medium stores an instruction, and when the instruction runs on the computer, the computer performs the methods according to the foregoing aspects.

Another aspect of this application provides a computer program product including an instruction. When the product runs on a computer, the computer performs the methods according to the foregoing aspects.

BRIEF DESCRIPTION OF DRAWINGS

To describe the technical solutions in the embodiments of the present invention or in the prior art more clearly, the following briefly describes the accompanying drawings required for describing the background and the embodiments.

FIG. 7a, FIG. 7b, FIG. 7c, FIG. 7d, FIG. 7e, FIG. 7f, and FIG. 7g are respective schematic diagrams of detection block coding formats according to an embodiment of the present invention;

FIG. 11 is a schematic diagram of a format of an idle block according to an embodiment of the present invention:

DESCRIPTION OF EMBODIMENTS

To make the objectives, technical solutions, and advantages of the present invention clearer and more comprehensible, the following further describes the present invention in detail with reference to the accompanying drawings and embodiments.

Figure 1:
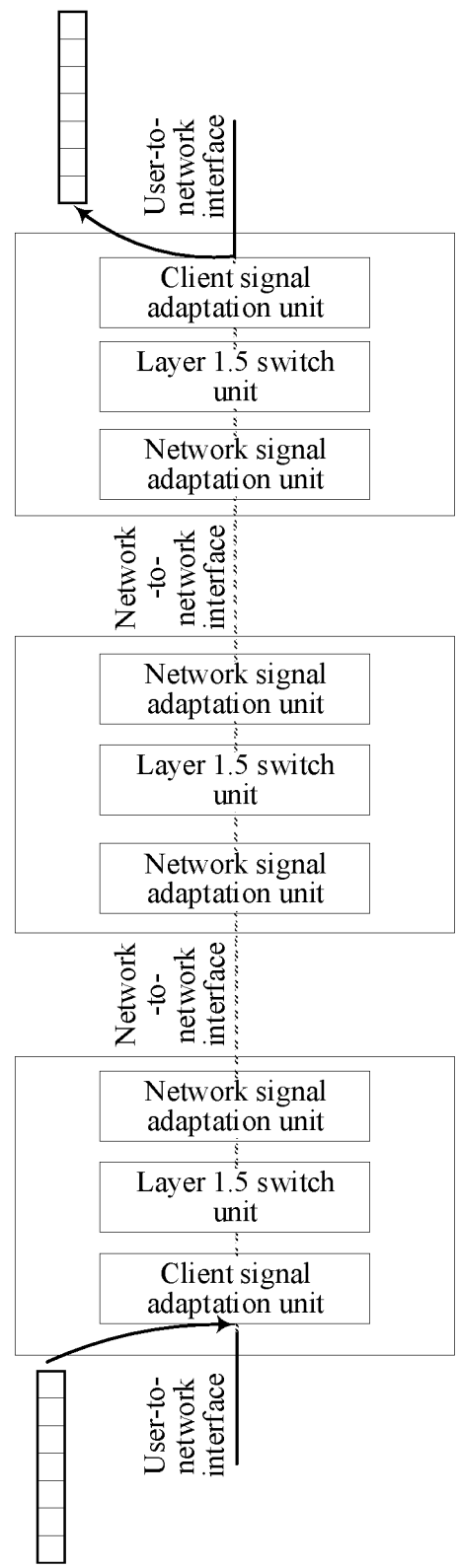
FIG. 1 is a schematic diagram of a networking architecture using a Layer 1.5 switching technology according to the prior art.
Figure 2:
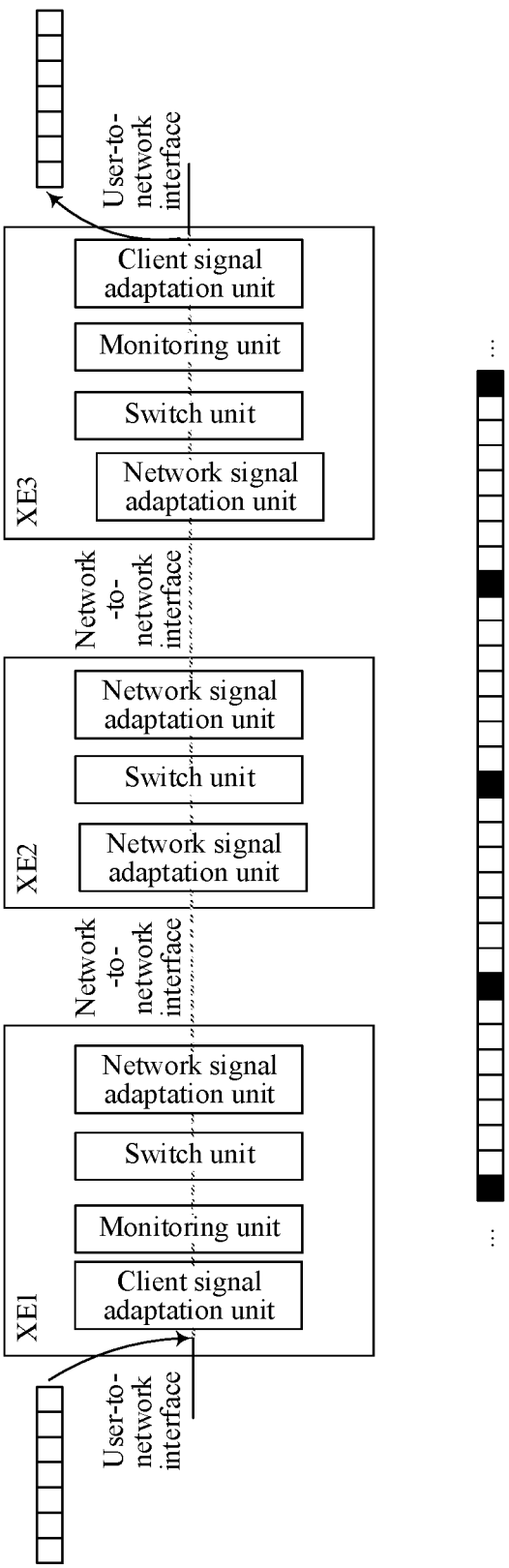
FIG. 2 is a schematic diagram of a network architecture according to an embodiment of the present invention.

FIG. 2 is a schematic diagram of a network architecture according to an embodiment of the present invention. As shown in FIG. 2, the network architecture includes network devices disposed on edges (Provider Edge, PE): XE1 and XE3, and a network device disposed in a middle position (Provider, P): XE2. A client device is connected to a network device PE at a transmit end, and transmits a generated client service (a data flow) to a network device PE at a receive end by using the network device PE at the transmit end and one or more network devices P. In some cases, a network may not include any network device P. This embodiment of the present invention may be applied to networking such as X-Ethernet, Ethernet, FlexE, an IP network, and an OTN. In this embodiment of the present invention, fault detection may be performed based on a coded bit block such as a 64 B/66 B bit block, an 8 B/10 B bit block, or a 256 B/257 B bit block. In this embodiment of the present invention, fault detection may alternatively be performed based on an uncoded bit block.

Figure 3A:
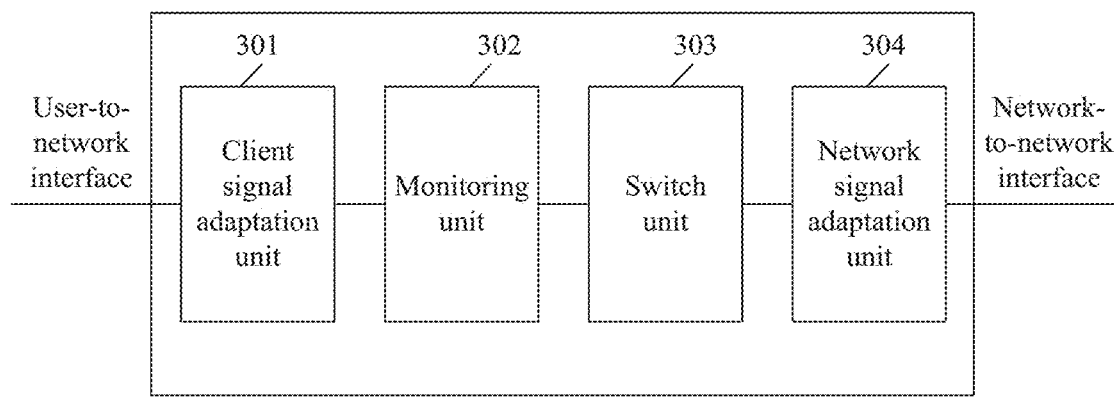
FIG. 3a to FIG. 3d are respective schematic structural diagrams of four network device PEs according to an embodiment of the present invention.
Figure 3B:
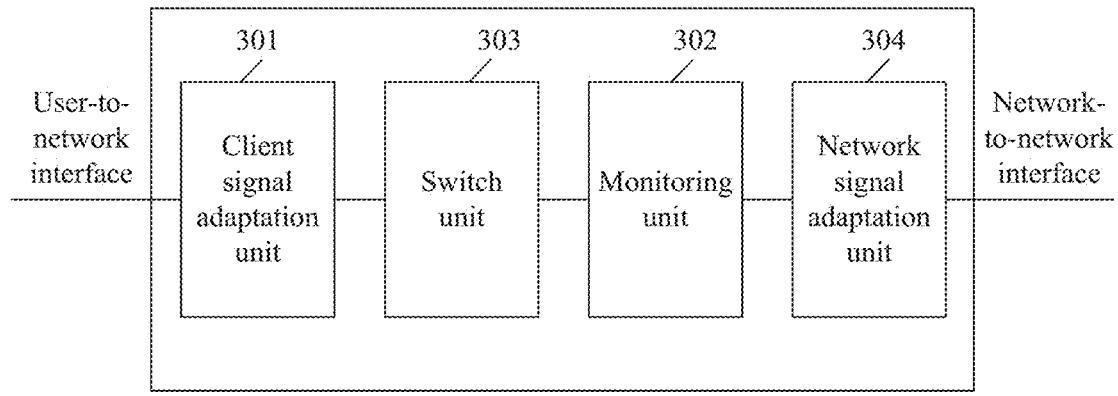
Figure 3C:
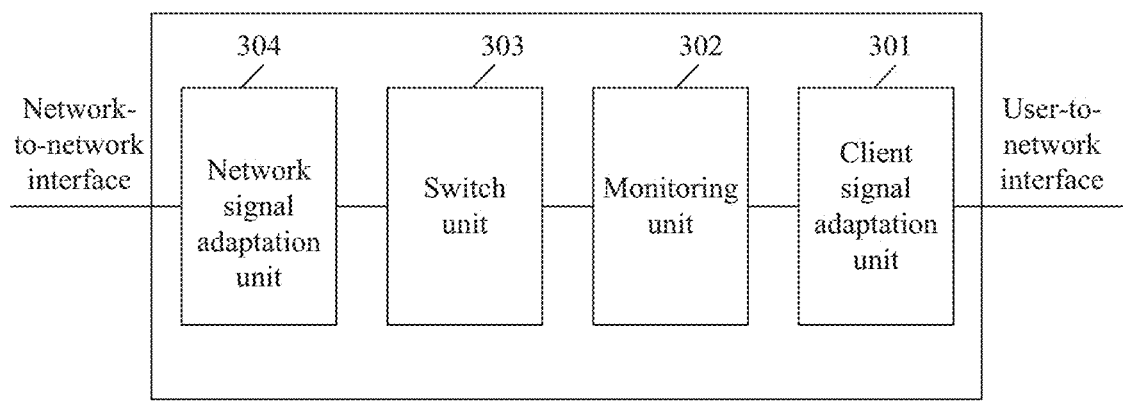
Figure 3D:
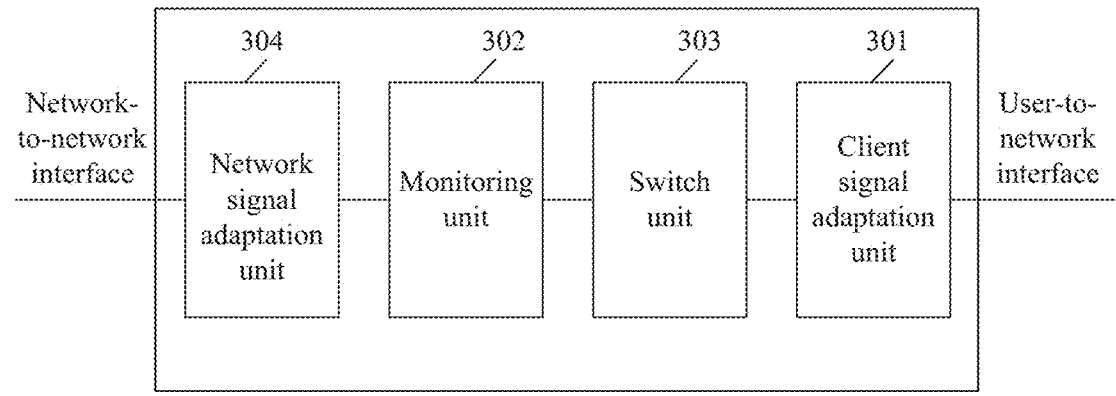

FIG. 3a to FIG. 3d are respective schematic structural diagrams of four network devices PE according to an embodiment of the present invention. As shown in FIG. 3a to FIG. 3d, a network device PE may include a client signal adaptation unit (uAdpt for short) 301, a switch unit (such as a Layer 1.5 switch unit, an X-E switch unit, an X-Ethernet switch unit, or a 66-bit block switch unit) 303, a network signal adaptation unit (nAdpt for short) 304, and a monitoring unit configured to perform connection fault detection (CnnM for short) 302. As shown in FIG. 3a and FIG. 3c, the monitoring unit 302 may be disposed between the client signal adaptation unit 301 and the switch unit 303. As shown in FIG. 3b and FIG. 3d, the monitoring unit 302 may alternatively be disposed between the switch unit 303 and the network signal adaptation unit 304. An interface connecting the network device PE and a client device is referred to as a user-to-network interface (user-to-network interface, UNI), and an interface connecting the network device PE and another network device is referred to as a network-to-network interface (network-to-network interface, NNI).

Figure 4A:
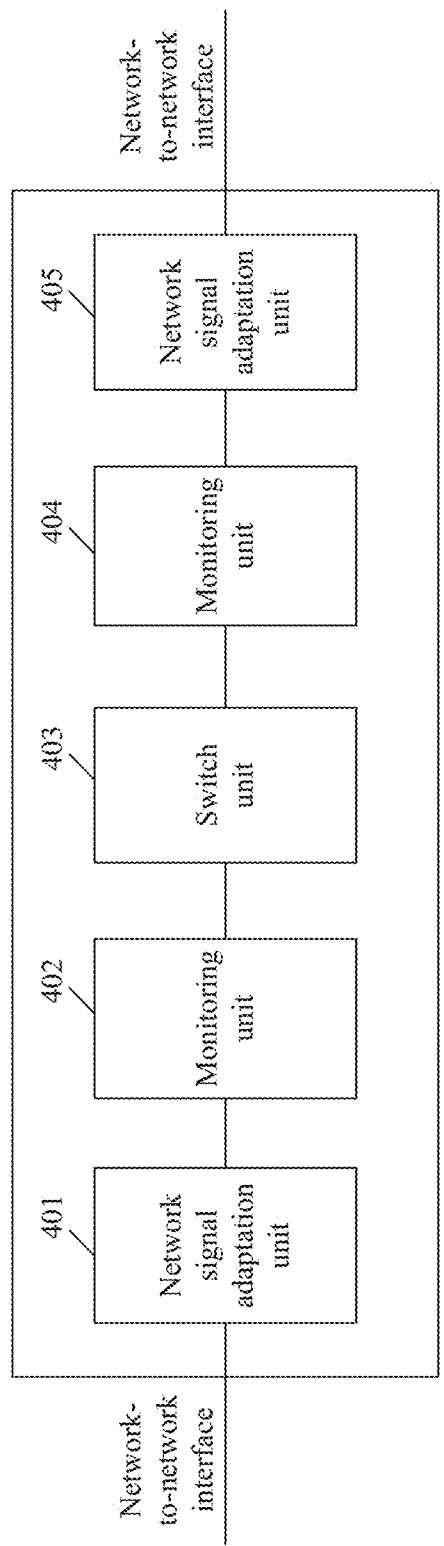
FIG. 4a to FIG. 4d are respective schematic structural diagrams of four network device Ps according to an embodiment of the present invention.
Figure 4B:
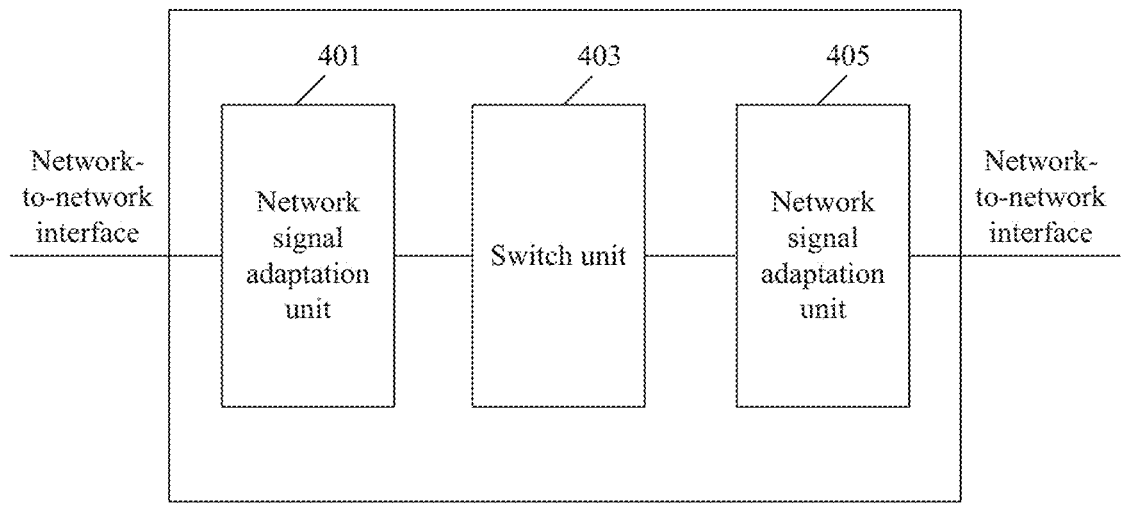
Figure 4C:
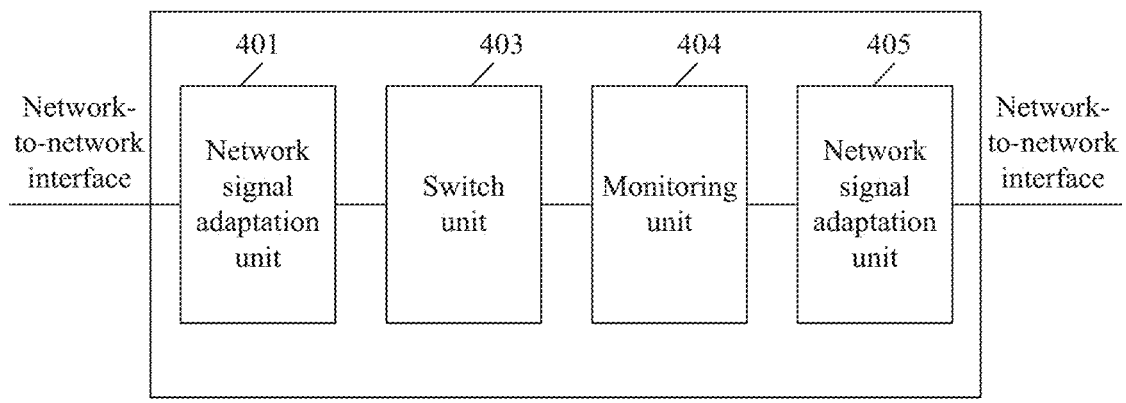
Figure 4D:
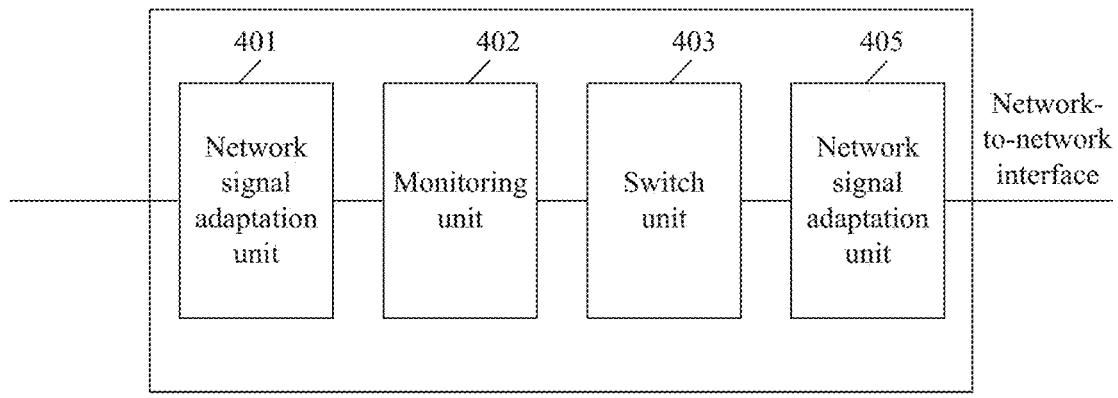

FIG. 4a to FIG. 4d are respective schematic structural diagrams of four network devices P according to an embodiment of the present invention. As shown in FIG. 4a to FIG. 4d, a network device P may include network signal adaptation units 401 and 405 and a switch unit 403. As shown in FIG. 4a, FIG. 4c, and FIG. 4d, either or both of monitoring units 402 and 404 may be further included. Optionally, as shown in FIG. 4b, a monitoring unit may not be disposed. An interface connecting the network device P and another network device is referred to as a network-to-network interface.

Figure 5A:
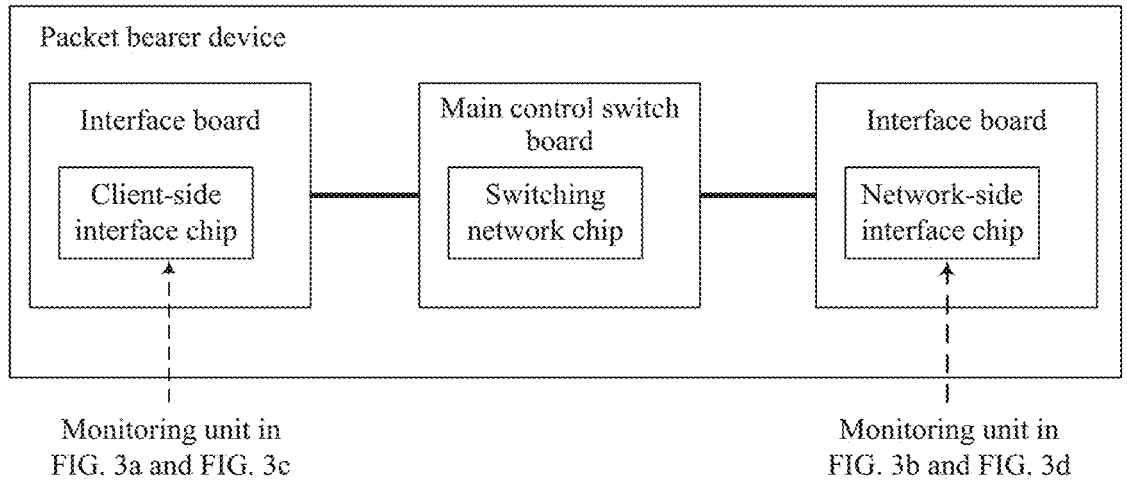
FIG. 5a and FIG. 5b are respective schematic structural diagrams of two packet bearer devices according to an embodiment of the present invention.
Figure 5B:
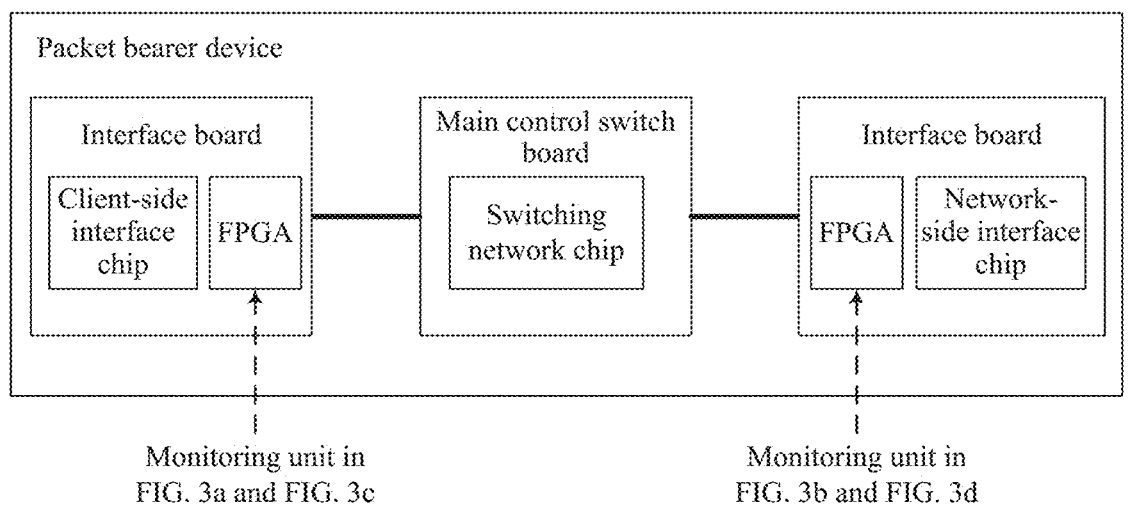

The network device PE and P in this embodiment of the present invention may be implemented in a packet bearer device such as an IP radio access network (IP radio access network, IP RAN) device or a packet transport network (packet transport network, PTN) device. FIG. 5a and FIG. 5b are respective schematic structural diagrams of two packet bearer devices according to an embodiment of the present invention. As shown in FIG. 5a and FIG. 5b, a network service PE is used as an example for description. A packet bearer device may include two interface boards: One interface board is provided with a client-side interface chip, and the other interface board is provided with a network-side interface chip. The packet bearer device may further include a main control switch board provided with a switching network chip. The client signal adaptation unit in FIG. 3a to FIG. 3d may be implemented by using the client-side interface chip. The network signal adaptation unit in FIG. 3a to FIG. 3d may be implemented by using the network-side interface chip. The switch unit in FIG. 3a to FIG. 3d may be implemented by using the switching network chip. The monitoring unit in the FIG. 3a and FIG. 3c may be disposed in the client-side interface chip or in an independent field programmable gate array (field programmable gate array, FPGA) or network processor (network processor, NP). The monitoring unit in FIG. 3b and FIG. 3d may be disposed in the network-side interface chip or in an independent FPGA or NP. Alternatively, some functions of the monitoring unit are implemented by using the client-side interface chip or the network-side interface chip, and some functions are implemented by using an independent FPGA or NP.

Figure 6:
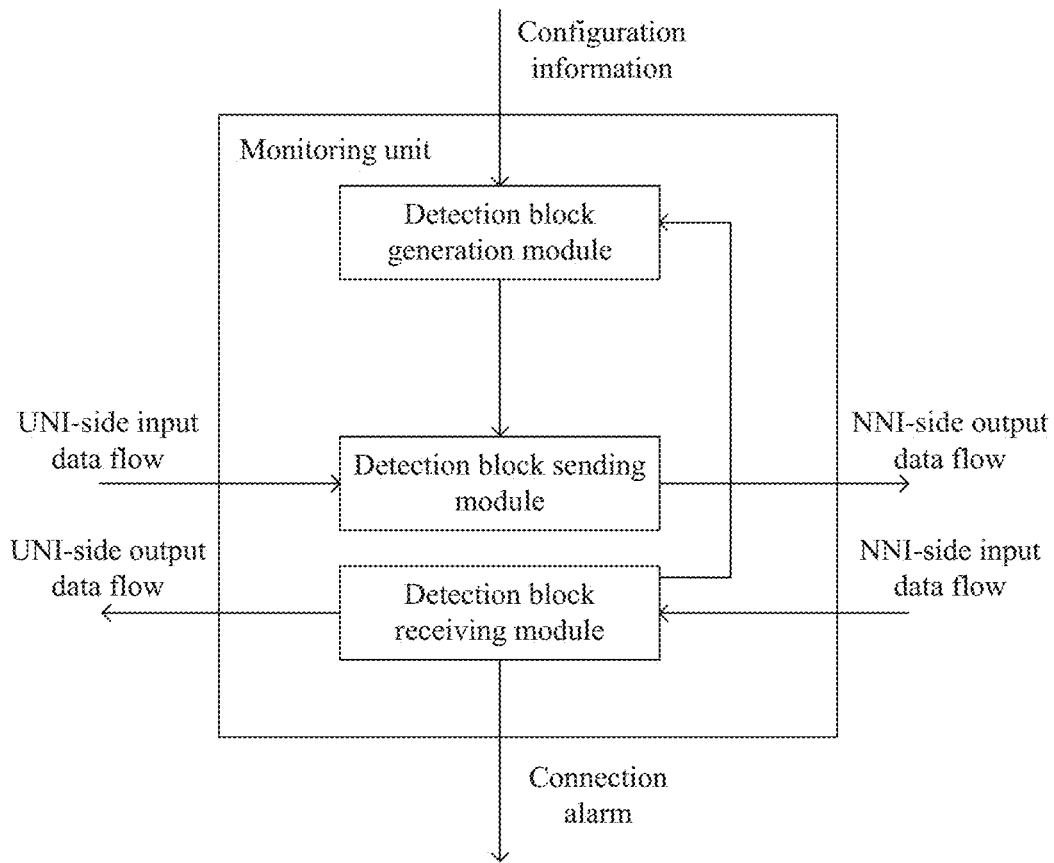
FIG. 6 is a schematic diagram of a logical structure of a monitoring unit according to an embodiment of the present invention.

In the network device according to this embodiment of the present invention, the monitoring unit configured for fault detection is added based on the prior art. FIG. 6 is a schematic diagram of a logical structure a monitoring unit according to an embodiment of the present invention. As shown in FIG. 6, a network service PE is used as an example for description. The monitoring unit may include a detection block generation module, a detection block sending module, a detection block receiving module, and the like. Functions of the modules are described in detail in the following embodiments.

Referring to the schematic diagram of the network architecture shown in FIG. 2, it is assumed that a type of a UNI is 1 Gigabit Ethernet (Gigabit Ethernet, GE) and a type of an NNI is 100 GE. A switch unit may be a Layer 1.5 switch unit, and a switching granularity of the switch unit is, for example, a 64 B/66 B bit block (or referred to as a 66-bit block). For example, a data flow of the network-to-network interface is also a 66-bit block data flow. The XE1 receives a data flow from the client device by using the UNI, and the data flow is received by the XE3 after passing through the XE2. The data flow passing through the XE1, the XE2, and the XE3 forms a connection (or referred to as a connection data flow, a connection bit block data flow, a bit block data flow, or the like). Fault detection, namely, connectivity check (connectivity check, CC), needs to be performed on the connection. A detection process may include the following several steps.

Step 1: The XE1 generates a detection block.

Figure 7A:
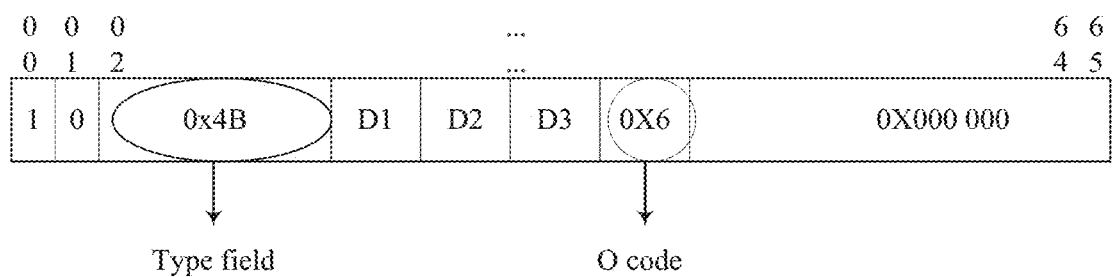

This step may be implemented by a monitoring unit in the XE1, for example, may be implemented by a detection block generation module. The detection block carries connectivity check information that may alternatively be referred to as a connectivity check block (connectivity check block, CCB). The detection block may be an uncoded bit block or a coded bit block (or referred to as a code block). In this embodiment of the present invention, an example in which the detection block is a 66-bit block is used for description, and a coding format of the 66-bit block may be implemented by extending a prior-art 66-bit control block. FIG. 7a, FIG. 7b, and FIG. 7c are respective schematic diagrams of three detection block coding formats according to an embodiment of the present invention. As shown in FIG. 7a, a type field is set to 0x4 B, and an O code field is set to 0x6. The detection block may include a flow identifier (identity, ID), and optionally, may include a reference sending period (T). The flow identifier is used to indicate a connection identifier of the data flow passing through the XE1, the XE2, and the XE3. The reference sending period is used to indicate a sending period of the detection block or a sending interval of two adjacent detection blocks. In FIG. 7b, a flow identifier 0x023 and a reference sending period 0x400 are added to fields D1 to D3. The flow identifier indicates that the connection identifier of the data flow passing through the XE1, the XE2, and the XE3 is 0x023, and the reference sending period indicates that a detection block is inserted every 1024 bit blocks. Adding the reference sending period to the detection block is to allow a receive end to detect the detection block based on the reference sending period. Optionally, the reference sending period may alternatively be directly configured on the receive end, and does not need to be carried in the detection block. One detection block may alternatively carry only a portion of the flow identifier, and n detection blocks need to be sent in sequence to carry the complete flow identifier. As shown in FIG. 7c, a complete flow identifier is 0x88 . . . 4523, a first detection block sends 0x23, a second detection block sends 0x45, and the last detection block, namely, an $n^{th}$ detection block, sends 0x88. Similarly, T is optionally sent. FIG. 7d, FIG. 7e, and FIG. 7f are respective schematic diagrams of other three detection block coding formats according to an embodiment of the present invention. As shown in FIG. 7d, a type field is set to 0x00. The detection block may include a flow identifier (identity, ID), and optionally, may include a reference sending period (T). The flow identifier is used to indicate a connection identifier of the data flow passing through the XE1, the XE2, and the XE3. The reference sending period is used to indicate a sending period of the detection block or a sending interval of two adjacent detection blocks. In FIG. 7e, a flow identifier 0x023 and a reference sending period 0x400 are added to fields D1 to D7. The flow identifier indicates that the connection identifier of the data flow passing through the XE1, the XE2, and the XE3 is 0x023, and the reference sending period indicates that a detection block is inserted every 1024 bit blocks. Adding the reference sending period to the detection block is to allow a receive end to detect the detection block based on the reference sending period. Optionally, the reference sending period may alternatively be directly configured on the receive end, and does not need to be carried in the detection block. One detection block may alternatively carry only a portion of the flow identifier, and a plurality of detection blocks need to be sent in sequence to carry the complete flow identifier. As shown in FIG. 7f, a complete flow identifier is 0x88 . . . 4523, a first detection block sends 0x23, a second detection block sends 0x45, and the last detection block, namely, an $n^{th}$ detection block, sends 0x88. Similarly, T is optionally sent.

The detection block may be further used to implement other operation, administration, and maintenance (operation, administration and maintenance, OAM) functions for connection management, such as bit interleaved parity (bit interleaved parity, BIP) for error detection, a remote error indication (remote error indication, REI), a client signal indication (CS), synchronization (SYNC), an alarm indication signal (alarm indication signal, AIS) at a service layer, a protection switching protocol (automatic protection switching, APS), and delay measurement (delay measurement, DM). When the detection block is used to implement a plurality of OAM functions, the detection block may further carry a type identifier, to distinguish between different functions. For example, a type of the detection block may include a type having a connectivity check function, and may alternatively include a type having any one or more of the foregoing OAM functions. As shown in FIG. 7g, a type field of 0x01 indicates the connectivity check function, 0 to 63 separately indicate that a $0^{th}$ detection block to a $63^{rd}$ detection block are sent, and each block carries only one of a $0^{th}$ portion to a $63^{rd}$ portion of a flow identifier. Similarly, if information carried in the other OAM functions needs to be carried in a plurality of detection blocks, for example, when a time stamp carried in one-way DM needs to be carried in a plurality of detection blocks that are sent in sequence, each detection block carries only a portion of the time stamp. A piece of OAM information may be carried in one detection block or in at least two detection blocks.

Step 2: The XE1 sends the detection block.

This step may be implemented by the monitoring unit in the XE1, for example, may be implemented by the detection block sending module. Before sending the detection block, the XE1 receives the data flow from the client device by using the UNI. Optionally, the XE1 may encode the received data flow or perform coding format conversion on the received data flow. For example, the data flow is an 8 B/10 B coded data flow. The XE1 performs coding format conversion by using a client signal adaptation unit, for example, converts 8 B/10 B encoding into 64 B/66 B encoding. For example, eight effectively coded IGE-bit blocks (each bit block is eight bits in size) form a 64-bit block, and then a 2-bit synchronization header is added to the 64-bit block to form a 66-bit block. A plurality of 66-bit blocks generate a 66-bit block data flow. While generating the 66-bit block data flow, the XE1 starts a counter based on the reference sending period for counting. For example, the reference sending period is "1024". When the counter counts to 1024 bit blocks, the monitoring unit performs idle block (IDLE) detection. For example, when the counter counts to 1029 bit blocks, an idle block is detected, the detection block generated in step 1 is substituted for the detected idle block, and the reference sending period of the detection block is updated to 1029. Then, the counter is reset to 0. A bit block data flow enters a switch unit, and is sent to a network side by using a network signal adaptation unit.

Figure 8:
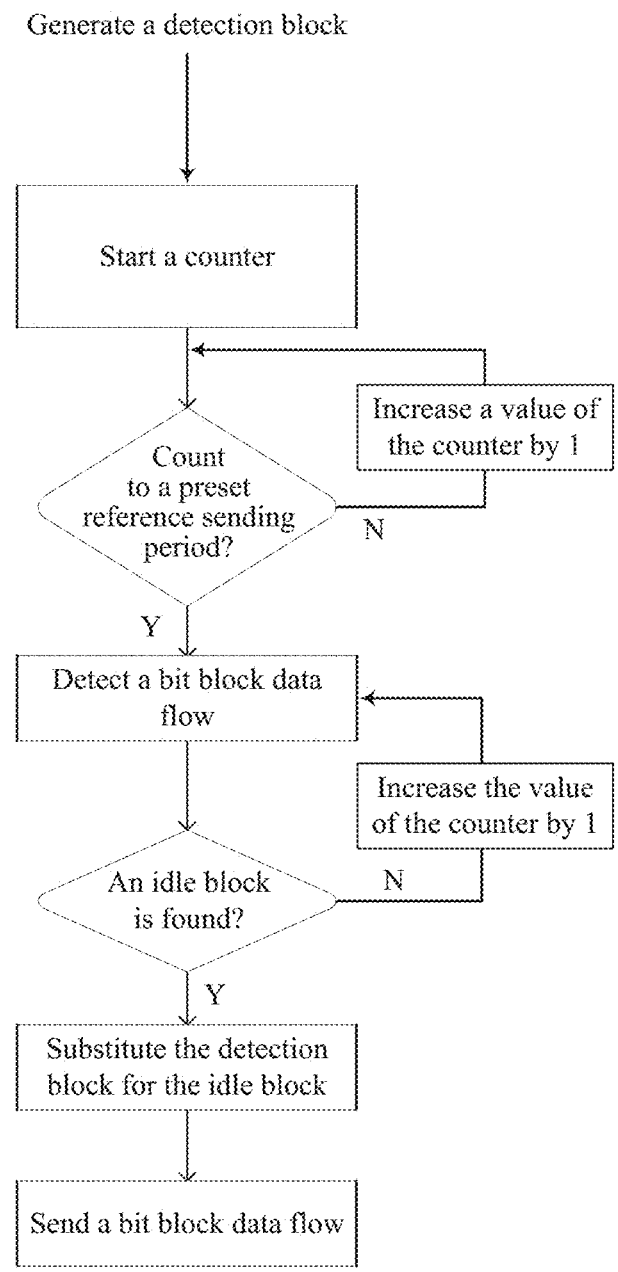
FIG. 8 is a flowchart of a detection block sending method according to an embodiment of the present invention.

FIG. 8 is a flowchart of a detection block sending method according to an embodiment of the present invention. As shown in FIG. 8, the detection block sending method may include the following steps: starting a counter to count a quantity of bit blocks in a bit block data flow; when a count value of the counter reaches a preset reference sending period, starting to detect the bit block data flow, and when an idle block in the bit block data flow is found, substituting a to-be-sent detection block for the idle block: if the count value of the counter exceeds the preset reference sending period, updating the reference sending period T of the detection block to a latest count value of the counter: and sending a bit block data flow.

Figure 9A:
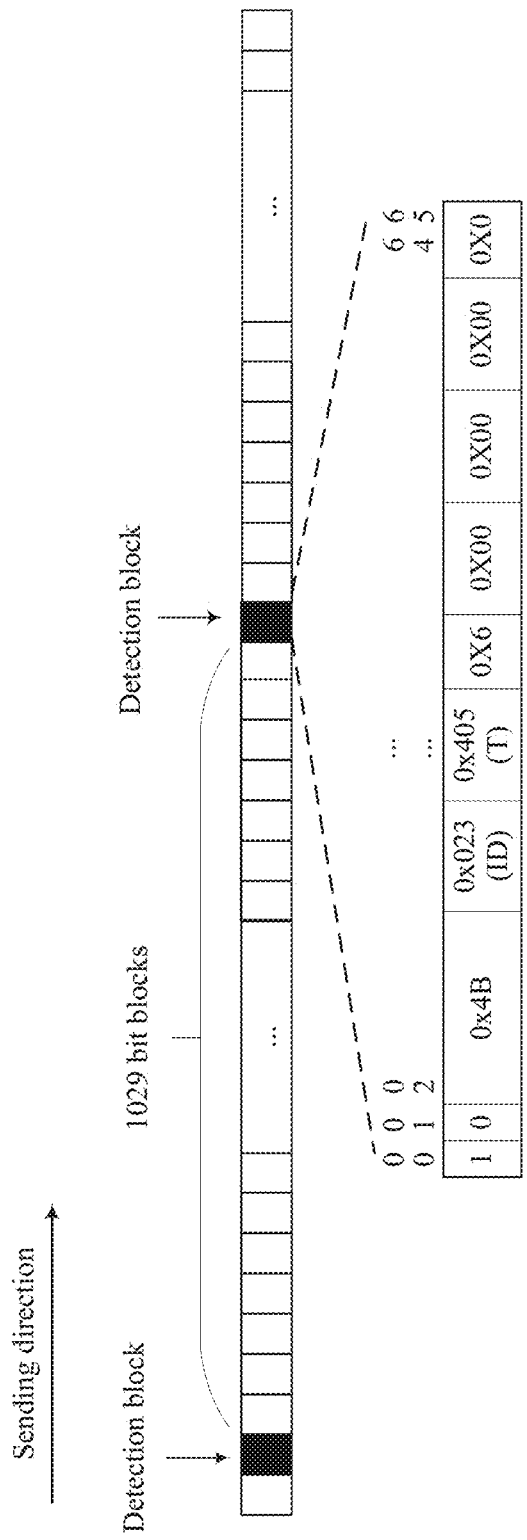
FIG. 9a, FIG. 9b, FIG. 9c, and FIG. 9d are schematic diagrams of four sent detection blocks according to an embodiment of the present invention.
Figure 9B:
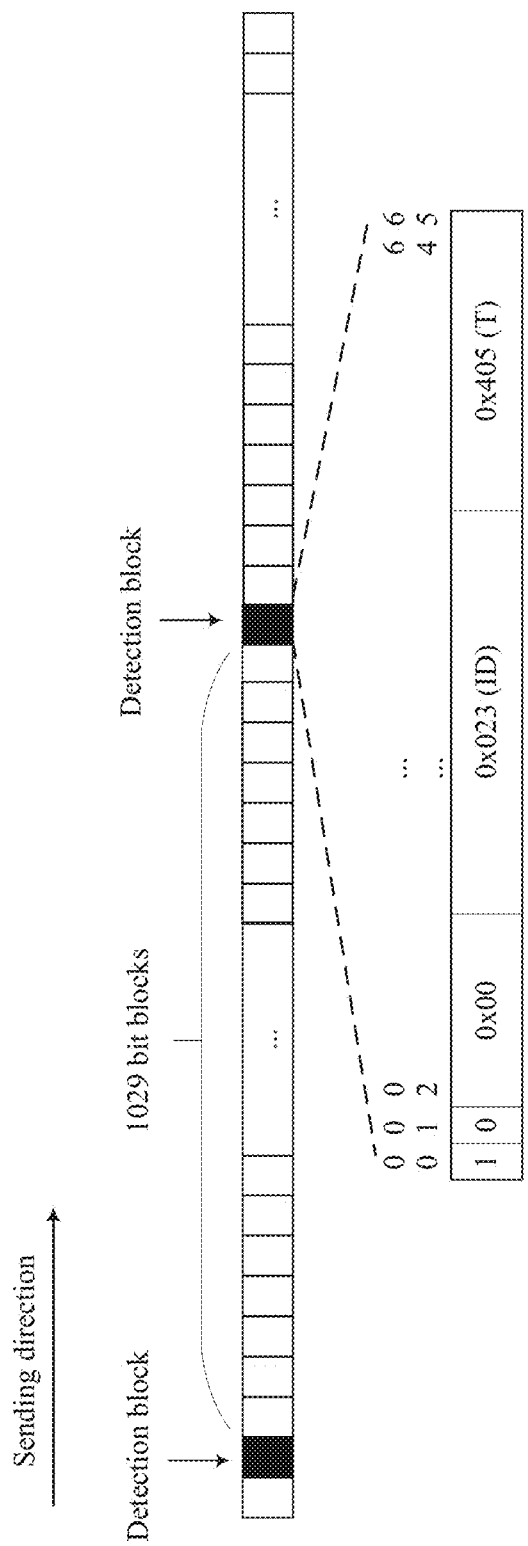
Figure 9C:
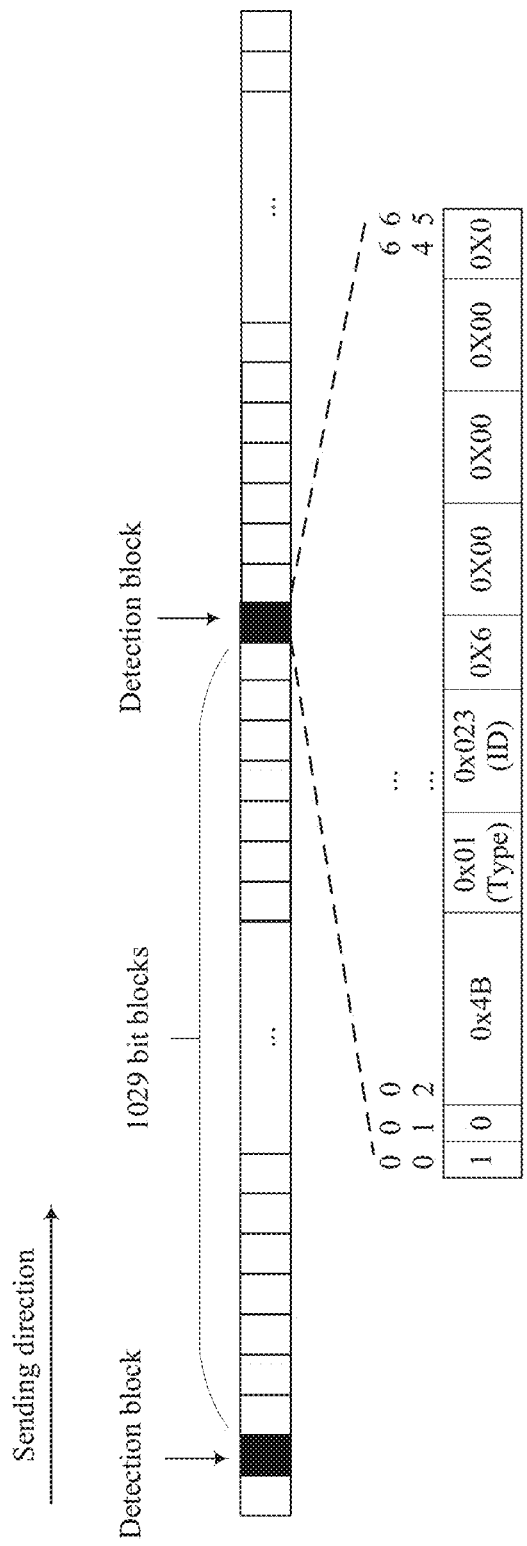
Figure 9D:
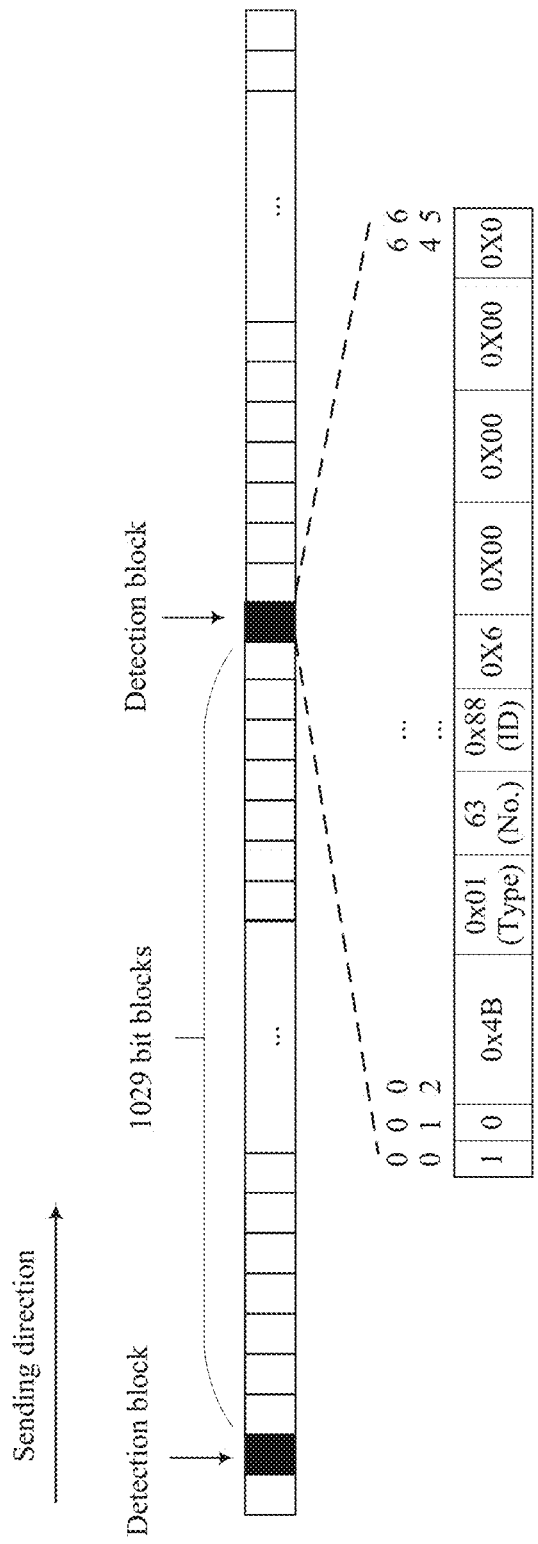

FIG. 9a, FIG. 9b, FIG. 9c, and FIG. 9d are schematic diagrams of sent detection blocks according to an embodiment of the present invention. As shown in FIG. 9a and FIG. 9b, an arrow direction in the figure is a sending direction of a bit block data flow, two inserted detection blocks are separated by 1029 bit blocks, and the reference sending period of a detection block is updated to 0x405. Optionally, the reference sending period may be updated with an actual sending period of the detection block, to be specific, the reference sending period field is updated to 0x405. Alternatively, the reference sending period may not be updated, to be specific, the reference sending period field is still set to 0x400. In this example, it may be flexibly selected whether the detection block carries the reference sending period and whether the reference period is updated. Optionally, when the detection block does not carry the reference sending period, a network device at a receive end detects and receives the detection block based on a local preset period. Similarly, when a flow identifier is carried in a plurality of detection blocks, the sent detection blocks in FIG. 9a and FIG. 9b carry some content of the flow identifier. As shown in FIG. 9d, a type field of 0x01 indicates a connectivity check block, and 63 indicates that the block carries content of a $63^{rd}$ portion of the flow identifier.

Figure 10:
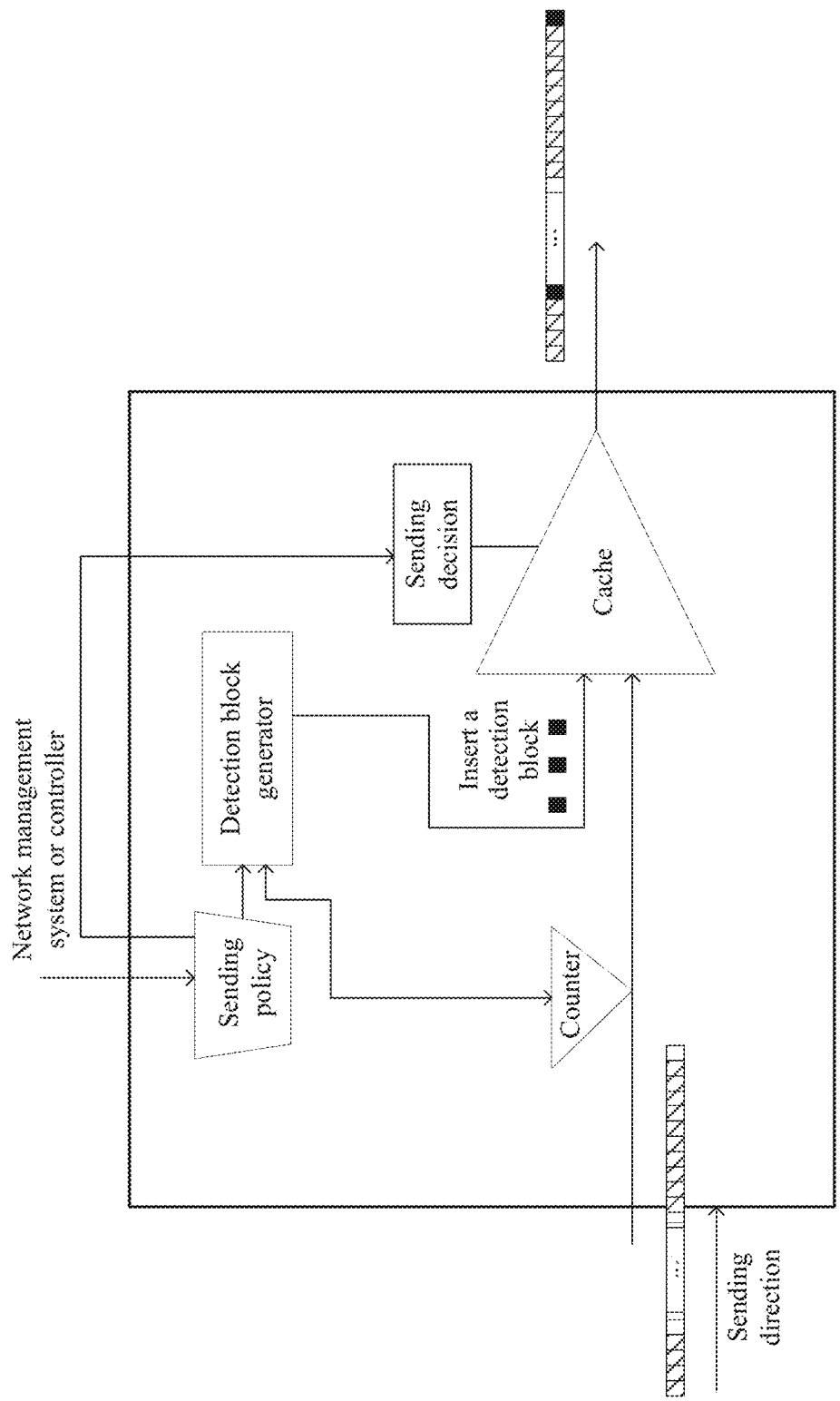
FIG. 10 is a schematic diagram of a logical structure of a detection block sending module according to an embodiment of the present invention.

FIG. 10 is a schematic diagram of a logical structure of a detection block sending module according to an embodiment of the present invention. As shown in FIG. 10, after the bit block data flow is received, the counter is started to count a quantity of bit blocks. The bit block data flow is sent to a cache, and the detection block generated by a detection block generator is inserted into the bit block data flow according to a preset sending policy. The preset sending policy may include the reference sending period and the like. The preset sending policy may be configured by a network management system or a controller.

In the foregoing detection block sending process, an idle block needs to be detected and substituted. FIG. 11 is a schematic diagram of a format of an idle block according to an embodiment of the present invention. As shown in FIG. 11, the idle block may be a 66-bit block, including a 2-bit synchronization header "10", a type field "0x1E", and eight fields "/I/(0x00)". An idle block detection method may include: performing matching on the synchronization header "10" and the type field "0x1E", or performing matching on all bits in the idle block. In this example, the idle block is found by using a plurality of matching methods, and a bandwidth resource of the idle block is occupied for sending. This has no impact on a service bandwidth.

The detection block sending method performed by substituting the idle block in this embodiment of the present invention is also applicable to sending of a bit block that has other OAM functions such as bit interleaved parity (BIP) for error detection, a remote error indication (REI), a client signal indication (CS), synchronization (SYNC), an alarm indication (AIS) at a service layer, a protection switching protocol (APS), and delay measurement (DM). When the detection block is used to implement a plurality of OAM functions, the detection block may further carry a type identifier, to distinguish between different functions. As shown in FIG. 9c, a type field indicates an OAM type, for example, 0x01 represents a connectivity check block. To be specific, different types of detection blocks have different type fields.

Step 3: The XE2 performs rate adaptation.

The XE2 receives a bit block data flow from the XE1 by using a network signal adaptation unit. If a receive clock frequency is slower than a system clock frequency of the XE2, the network signal adaptation unit in the XE2 needs to insert one or more idle blocks into the bit block data flow; or if a receive clock frequency is faster than a system clock frequency of the XE2, the network signal adaptation unit in the XE2 needs to delete one or more idle blocks from the bit block data flow, to resolve a transport rate adaptation problem caused by clock frequency non-synchronization. After the network signal adaptation unit in the XE2 performs rate adaptation, the bit block data flow is transferred to the downstream network side by using a switch unit. Optionally, if the receive clock frequency is adapted to the system clock frequency of the XE2, the XE2 does not need to perform rate adaptation.

Figure 12:
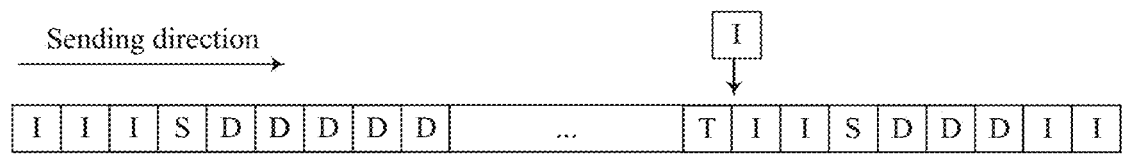
FIG. 12 is a schematic diagram of rate adaptation according to an embodiment of the present invention.

FIG. 12 is a schematic diagram of rate adaptation according to an embodiment of the present invention. As shown in FIG. 12, an arrow direction in the figure is a sending direction of a bit block data flow, and the bit block data flow includes a start block "S", a termination block "T", a data block "D", and an idle block "I". For example, an idle block may be inserted or deleted between the start block and the termination block.

Step 4: The XE3 receives the detection block.

This step may be implemented by a monitoring unit in the XE3, for example, may be implemented by a detection block receiving module. After the network device XE3 located on an edge receives a bit block data flow from the XE2, the bit block data flow passes through a network adaptation unit and arrives at the monitoring unit. Optionally, if the monitoring unit is disposed behind a switch unit, the bit block data flow passes through the switch unit and arrives at the monitoring unit. The monitoring unit starts a detection block discovering process, including: detecting a detection block based on a feature of the detection block, and extracting the flow identifier 0x023 and the reference sending period 0x405. Flow identifier matching is first performed. When the flow identifier is consistent with a flow identifier (0x023) that is configured locally and expected to be received, the reference sending period (0x405) is extracted, and a timeout of the counter is set to the reference sending period. For example, the timeout is a time during which 1029 bit blocks are received. Optionally, another counter may be set, and a timeout of the another counter is greater than the reference sending period. For example, the timeout is a time during which 3×1029 bit blocks are received. When the flow identifier is inconsistent with the flow identifier that is configured locally and expected to be received, a misconnection alarm is triggered, and a remote defect indication (remote defect indication, RDI) is immediately sent back. When N (such as five) detection blocks in which flow identifiers match the flow identifier are received in succession, the misconnection alarm is triggered to disappear, and the RDI stops being sent back.

Figure 13A:
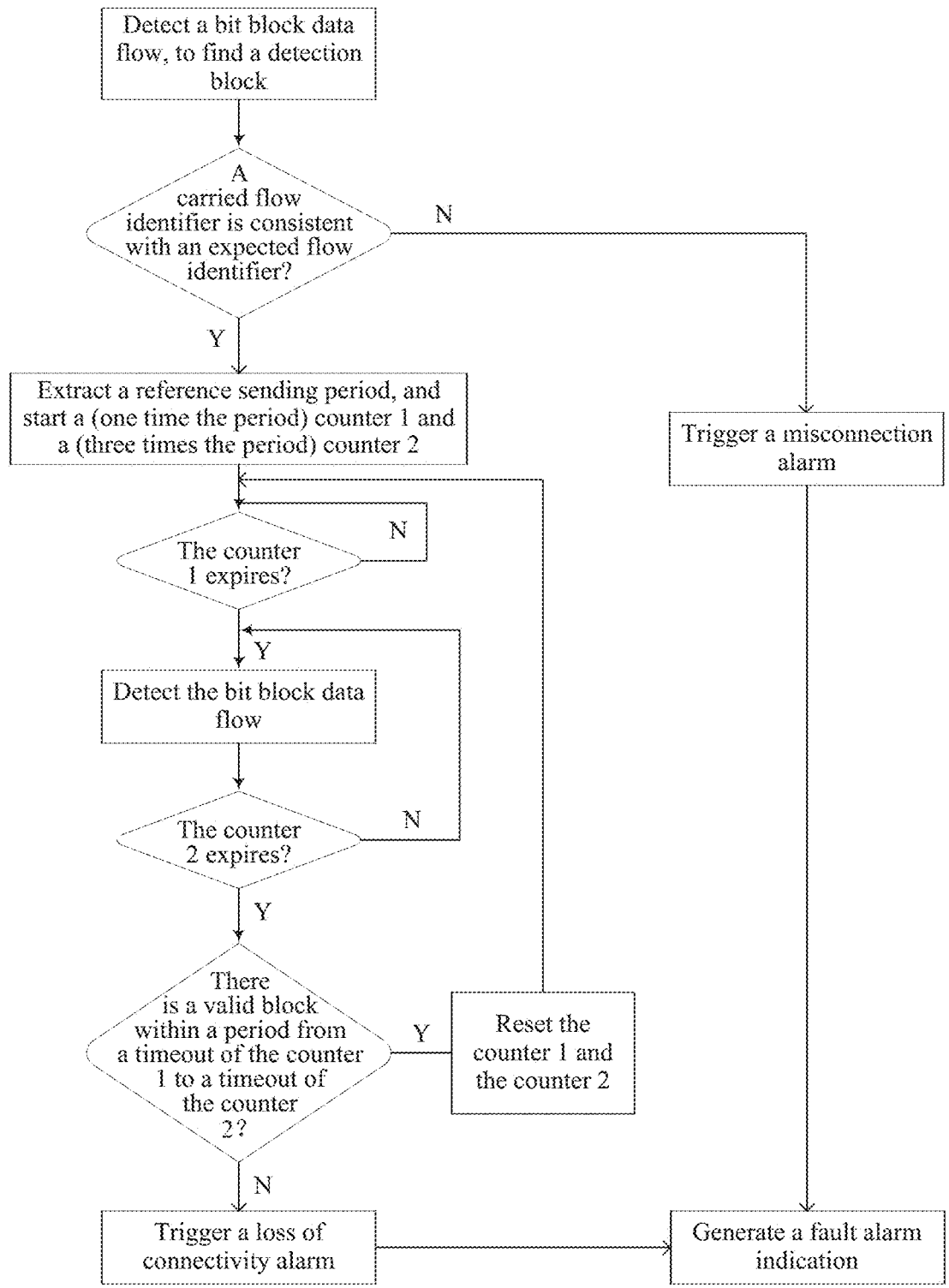
FIG. 13a, FIG. 13b, FIG. 13c, and FIG. 13d are respective flowcharts of detection block receiving methods according to an embodiment of the present invention.
Figure 13B:
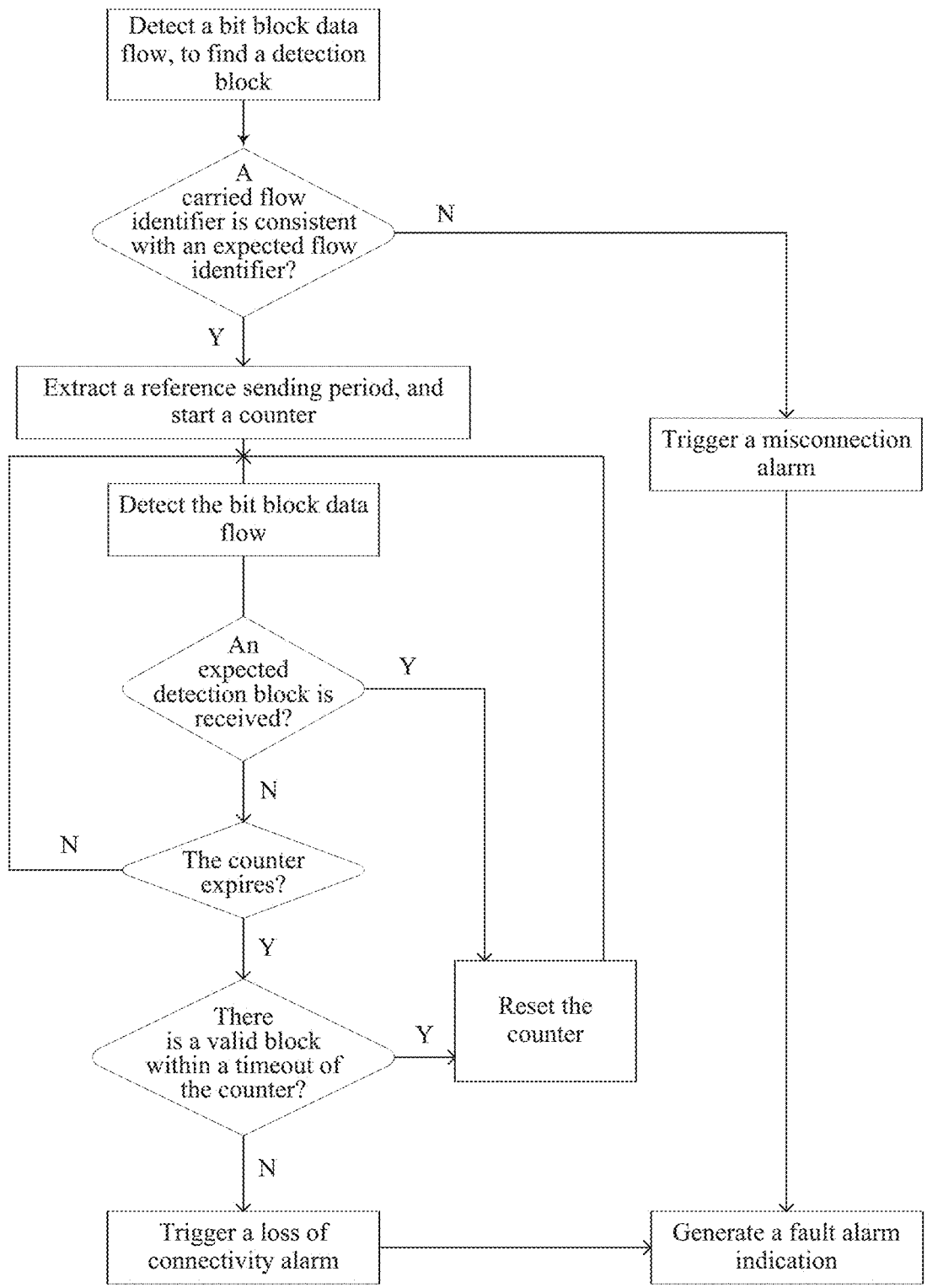

FIG. 13a is a flowchart of a detection block receiving method according to an embodiment of the present invention. As shown in FIG. 13a, the detection block receiving method may include the following steps: Detection is performed on a bit block data flow, and whether a detection block is received is determined based on a feature of the detection block. After it is determined that the detection block is received, if a flow identifier carried in the detection block is inconsistent with an expected flow identifier, a local misconnection alarm flag is updated, and a fault alarm indication is generated; for example, an RDI is generated; or if a flow identifier carried in the detection block is consistent with an expected flow identifier, a reference sending period is extracted. A counter 1 is set, a timeout of the counter 1 is set to one time the reference sending period T, and the counter 1 starts counting; and a counter 2 is set, a timeout of the counter 2 is set to three times the reference sending period T, and the counter 2 starts counting. When the counter 1 counts to the one time the reference sending period, a block type of the bit block data flow starts to be detected. When the counter 2 counts to the three times the reference sending period, a valid bit block (for example, any combination of the start block "S", the termination block "T", and the data block "D") is not detected, and a loss of connectivity (loss of connectivity, LOC) alarm is triggered. In addition, a fault alarm indication is generated. For example, an RDI is generated. FIG. 13b is a flowchart of another detection block receiving method according to an embodiment of the present invention. As shown in FIG. 13b, a difference between FIG. 13b and FIG. 13a lies in that only one counter may be set, and a timeout of the counter may be one time the reference sending period or any another time length. When the counter starts counting, detection is performed on a block type of a bit block data flow. When the counter counts to a preset timeout, if a valid bit block is not detected, a loss of connectivity alarm is triggered. Two counters with different timeouts are set, a detection block is not received within a period from a moment 0 to a long counter (the counter 2) timeout, and a valid bit block is not detected within a period from a short counter (the counter 1) timeout to the long counter timeout. From this, the loss of connectivity can be accurately determined. In this example, the counter 1 and the counter 2 are flexibly set, and accurate and reliable connection fault determining is performed based on whether a valid bit block is received. This can be further flexibly simplified by setting only the counter 2, to further reduce implementation difficulty.

Optionally, the reference sending period may be directly configured in a network device, and does not need to be carried in the detection block. For example, the XE1 configures a reference sending period 0x400, and the XE3 configures a reference receiving period 0x400. In step 4, the timeouts of the counter 1 and the counter 2 may be set based on the configured reference receiving period 0x400. Optionally, a counting period of the counter 1 may be N times the reference sending period T. For example, N is set to 1, or may be 1.5 or another user-defined value. A counting period of the counter 2 may be M times the counting period of the counter 1. For example, M is set to 3, or may be a user-defined value. Optionally, only one counter such as the counter 2 may be set. After the counter 2 expires, whether a valid bit block is received is determined, and therefore connection fault determining is performed. Optionally, after the counter 2 expires, whether a valid bit block is received may not be determined, but a loss of connectivity alarm is directly triggered.

Figure 13C:
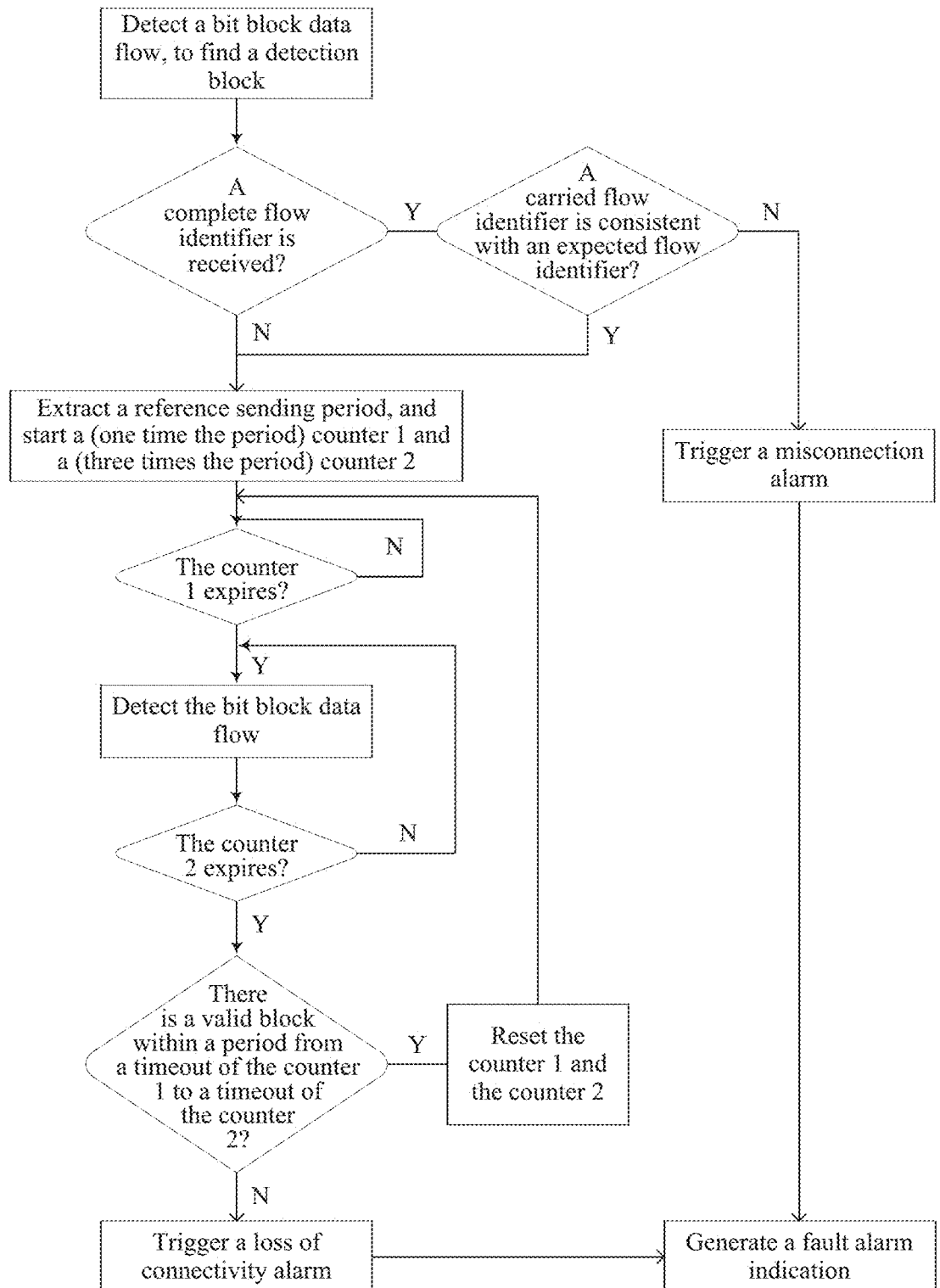
Figure 13D:
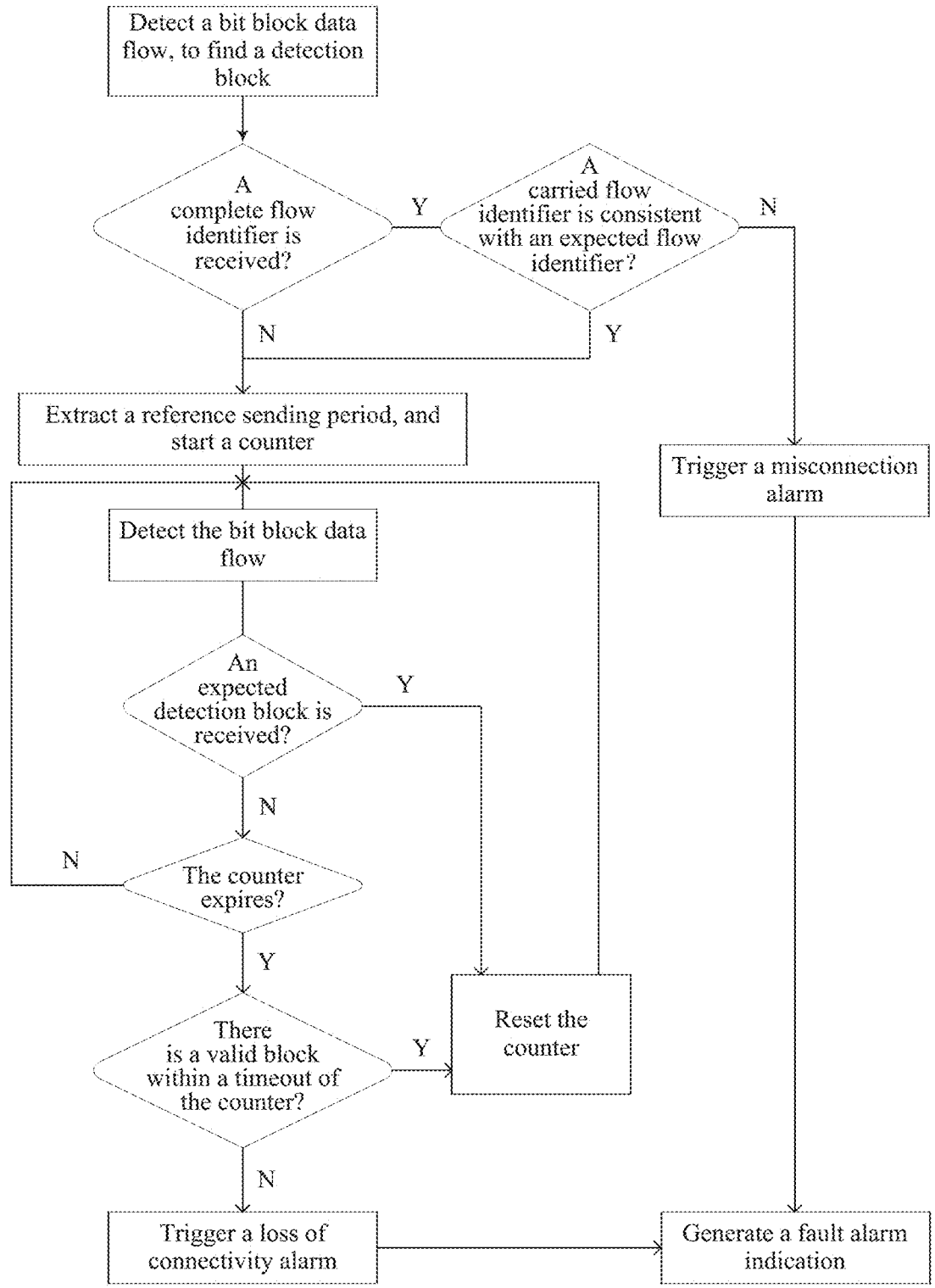

Optionally, when the flow identifier is relatively long, and a plurality of detection blocks need to be sent in sequence to carry the flow identifier, each detection block carries only one portion of the flow identifier. As shown in FIG. 9d, the receiver XE3 can restore the complete flow identifier only after receiving the plurality of detection blocks in sequence, and then determines whether there is a misconnection. When a detection block is received, but the complete flow identifier is not restored, there is no misconnection by default, and connectivity check is directly performed. A process is shown in FIG. 13c. A difference between FIG. 13d and FIG. 13c lies in that only one counter may be set, and a timeout of the counter may be one time the reference sending period or any another time length.

Figure 14A:
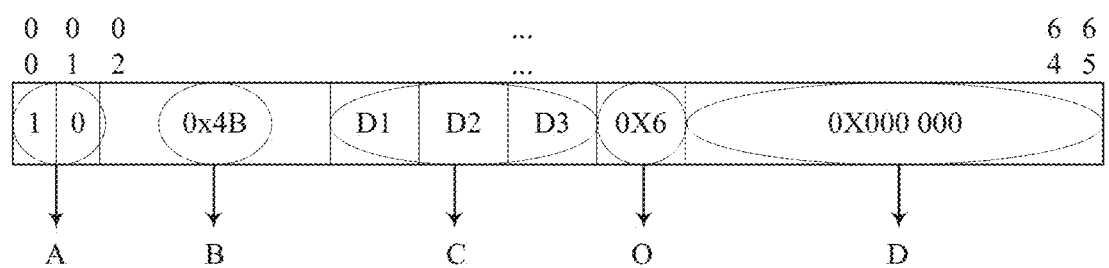
FIG. 14a and FIG. 14b are schematic diagrams of two detection block coding formats according to an embodiment of the present invention.
Figure 14B:
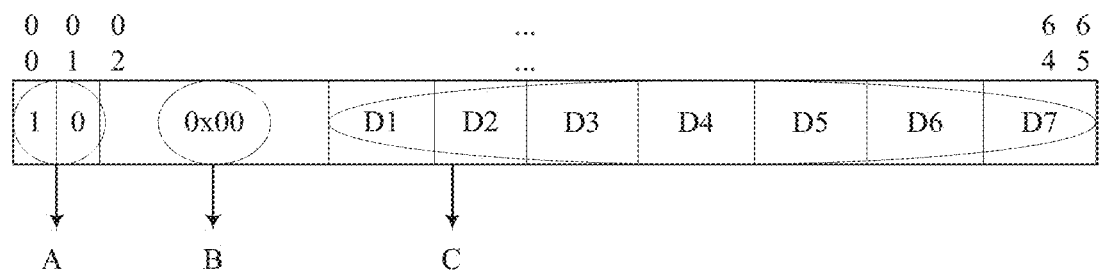

In the foregoing detection block receiving process, the detection block needs to be identified based on the feature of the detection block. FIG. 14a is a schematic diagram of a coding format of a detection block according to an embodiment of the present invention. As shown in FIG. 14a, matching may be performed on fields A+B+O, on fields A+B+O+C, or another field combination, to identify the detection block. Detection on the block type of the bit block data flow in the foregoing may be detection on a synchronization header, a type field, and the like. Optionally, if the detection block includes a type identifier, matching may alternatively be performed on a type identifier field, and a function type indicated by the detection block is identified by using the type identifier field. When a newly defined control code block is used, for example, a code block in which a type field reserved in the 66-bit block is 0x00, and other 56 bits are 8-bit data, a matching manner may be A+B, as shown in FIG. 14b.

The detection block receiving method in this embodiment of the present invention is also applicable to receiving of a bit block that has other OAM functions such as bit interleaved parity (BIP) for error detection, a remote error indication (REI), a client signal indication (CS), synchronization (SYNC), an alarm indication (AIS) at a service layer, protection switching protocol (APS), and delay measurement (DM).

Figure 15:
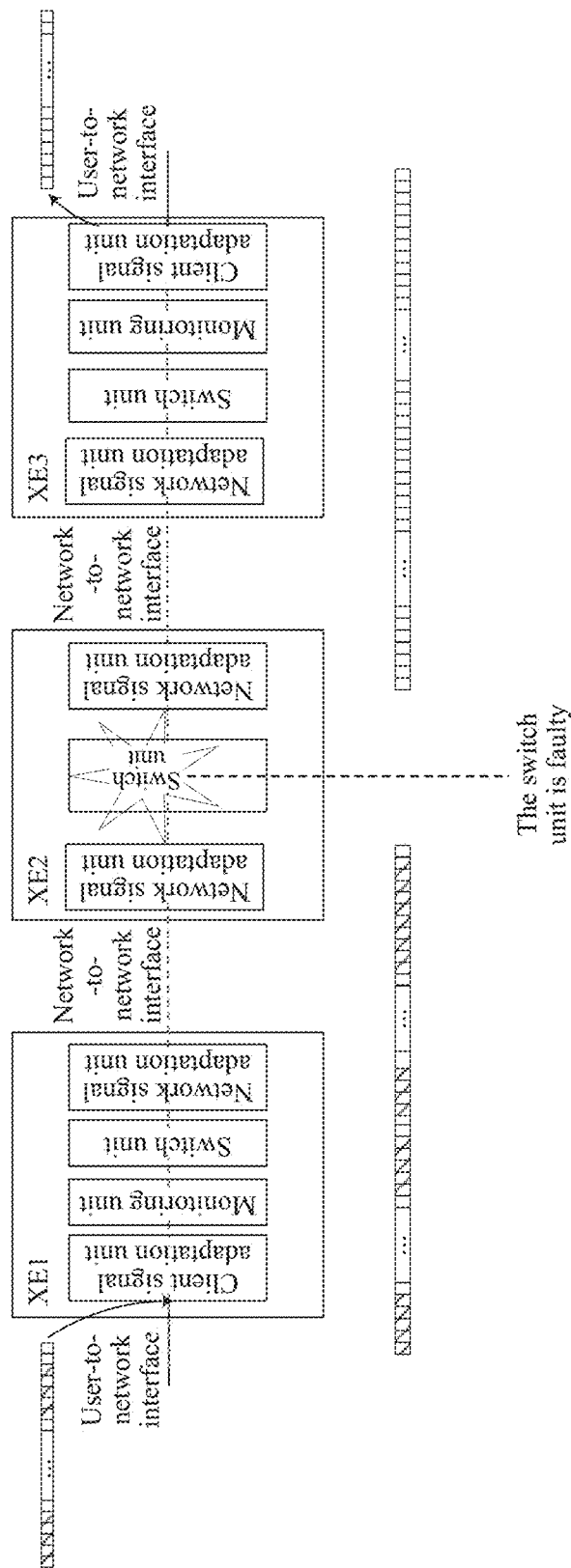
FIG. 15 is a schematic diagram of a network architecture according to an embodiment of the present invention.

The following describes a processing step after a fault occurs on a network. FIG. 15 is a schematic diagram of a network architecture according to an embodiment of the present invention. As shown in FIG. 15, it is assumed that the switch unit in the XE2 is faulty. The XE1 generates and sends a detection block. The XE3 receives the detection block, for example, by using the receiving method in FIG. 13a. When the counter 1 expires, detection starts to be performed on a block type of the bit block data flow, until the counter 2 expires. If an expected detection block is received within a period from the timeout of the counter 1 to the timeout of the counter 2, the two counters are reset. If an expected detection block is not received within a period from the timeout of the counter 1 to the timeout of the counter 2, detection starts to be performed on the block type of the bit block data flow at a moment at which counter 1 expires. If a valid bit block (for example, any combination of the start block "S", the termination block "T", and the data block "D") is detected, the two counters 1 and 2 are reset. If a valid bit block is not detected, an LOC alarm is triggered, and an RDI is generated and sent back. When N (such as five) expected correct detection blocks are received in succession, the LOC alarm is triggered to disappear, and the RDI stops being sent back. The XE3 triggers the LOC alarm, and informs the XE1 at a transmit end of a fault status by sending back a fault alarm indication (such as a fault alarm indication block). The fault alarm indication block may be an RDI bit block, and for example, may include a flow identifier and a remote defect indication (RDI). Optionally, the RDI bit block may alternatively include a type identifier, to indicate that the RDI bit block has a fault alarm indication function.

Similarly, a valid block may not be detected in the foregoing embodiment, and a specific processing step is simplified as follows. As shown in FIG. 15, it is assumed that the switch unit in the XE2 is faulty. The XE1 generates and sends a detection block. The XE3 receives the detection block, for example, by using the receiving method in FIG. 13d. If the counter 2 expires, an LOC alarm is triggered, and an RDI is generated and sent back. When N (such as five) expected correct detection blocks are received in succession, the LOC alarm is triggered to disappear, and the RDI stops being sent back. The XE3 triggers the LOC alarm, and informs the XE1 at a transmit end of a fault status by sending back a fault alarm indication (such as a fault alarm indication block). The fault alarm indication block may be an RDI bit block, and for example, may include a flow identifier and a remote defect indication (RDI). Optionally, the RDI bit block may alternatively include a type identifier, to indicate that the RDI bit block has a fault alarm indication function.

For both-way connection, when a data flow exists in a direction from the XE1 to the XE3 and a direction from the XE3 to the XE1, the XE1 may also receive a detection block generated by the XE3. For example, the monitoring unit in the XE1 receives the detection block in a manner similar to step 4, and performs connection fault detection.

In this embodiment of the present invention, a type of detected fault may include any one or more of a misconnection, a loss of connectivity, and a remote defect. The network device may transfer a fault status to a local automatic protection switching (APS) function unit, to implement a corresponding self-healing policy; transfer the fault status to a software-defined networking (software-defined networking, SDN) controller, to implement a corresponding connection restoration policy; or transfer the fault status to a network management system, to perform corresponding alarm management and a corresponding warning function.

Figure 16:
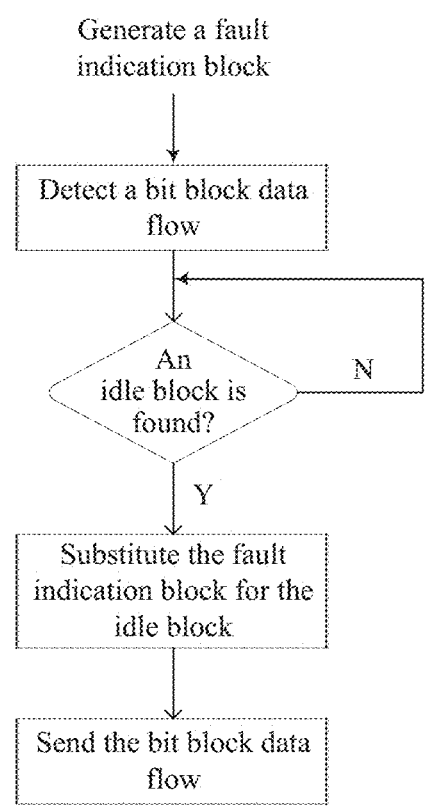
FIG. 16 is a flowchart of a fault indication block sending method according to an embodiment of the present invention.

FIG. 16 is a flowchart of a fault indication block sending method according to an embodiment of the present invention. As shown in FIG. 16, the fault indication block sending method is similar to the detection block sending method, and may include the following steps: when a receive end detects a fault (for example, when a detection block is not received after a preset reference period expires, it may be determined that a connection is interrupted in this case), and a fault indication block needs to be sent, starting to detect a bit block data flow; when an idle block in the bit block data flow is found, substituting the fault indication block for the idle block; and sending a bit block data flow. When a flow identifier needs to be carried, the flow identifier or a portion of the flow identifier is added to the fault indication block for sending.

Figure 17A:
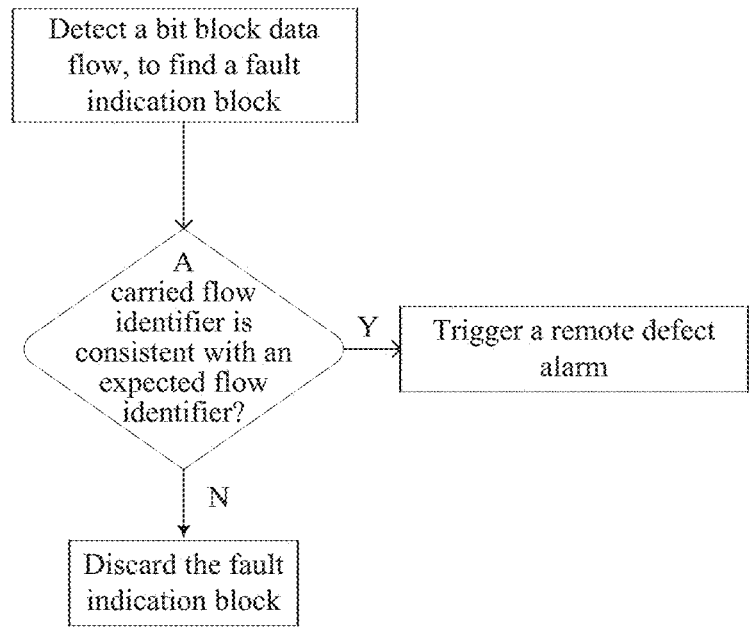
FIG. 17a, FIG. 17b, and FIG. 17c are flowcharts of three fault indication block receiving methods according to an embodiment of the present invention.
Figure 17B:
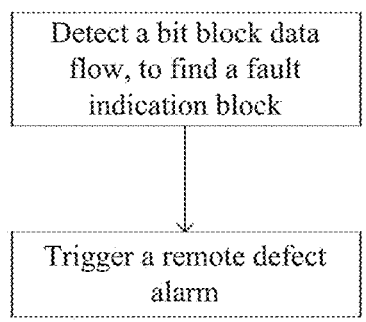
Figure 17C:
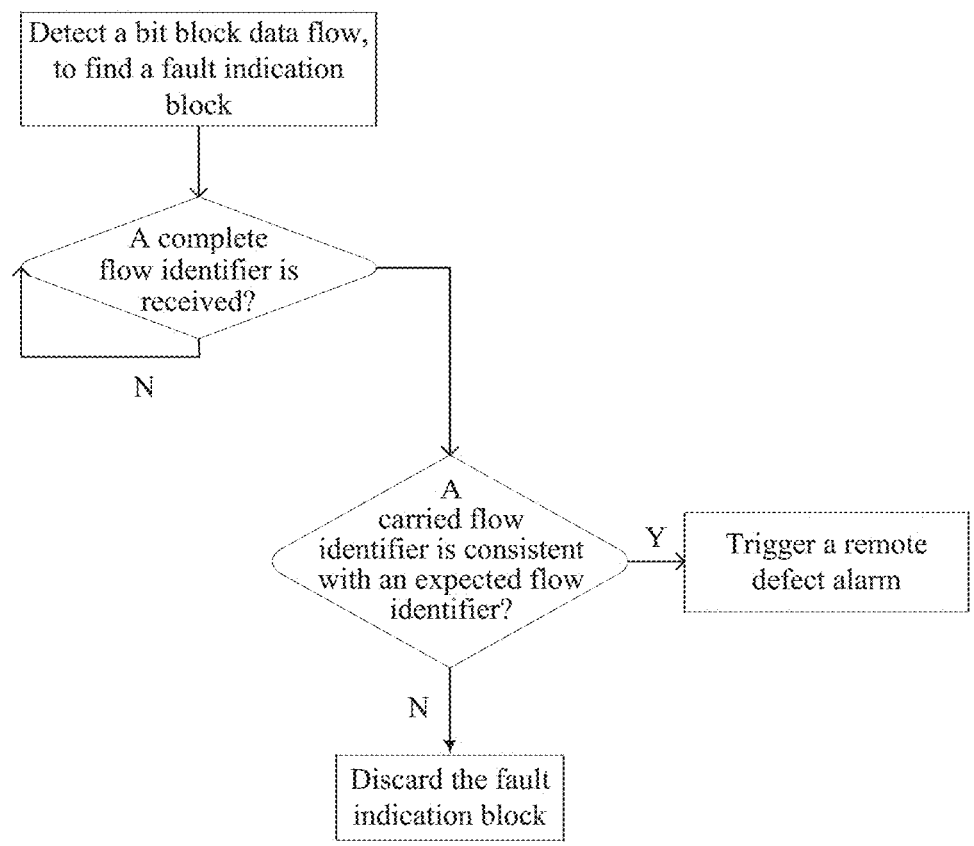

FIG. 17a is a flowchart of a fault indication block receiving method according to an embodiment of the present invention. As shown in FIG. 17a, the fault indication block receiving method is similar to the detection block receiving method, and may include the following steps: detecting a received bit block data flow, to find a fault indication block; and when a flow identifier carried in the fault indication block is inconsistent with an expected flow identifier, discarding the fault indication block: or when a flow identifier carried in the fault indication block is consistent with an expected flow identifier, updating a local remote defect indication (RDI) flag with a remote detect indication field in the fault indication block. When a fault indication block does not carry a flow identifier, as shown in FIG. 17b, the fault indication block receiving method is similar to the detection block receiving method, and may include the following steps: detecting a received bit block data flow, to find a fault indication block; and updating a local remote defect indication (RDI) flag with a remote defect indication field in the fault indication block. When a fault indication block carries a portion of a flow identifier, as shown in FIG. 17c, the fault indication block receiving method is similar to the detection block receiving method, and may include the following steps: detecting a received bit block data flow, to find a fault indication block: and when a flow identifier carried in the fault indication block is only a portion of a flow identifier, waiting for receiving a next fault indication block, until all portions of the flow identifier are collected to restore the complete flow identifier; when the flow identifier is inconsistent with an expected flow identifier, discarding the fault indication block and restarting detection; or when the flow identifier carried in the fault indication block is consistent with an expected flow identifier, updating a local remote defect indication (RDI) flag with a remote detect indication field in the fault indication block.

Optionally, the steps such as generating, sending, receiving, and processing the detection block in this embodiment of the present invention are also applicable to other OAM functions (which are referred to as OAM function blocks). Table 1 is a coding format of a 66-bit block. When an OAM function block is the 66-bit block, the OAM function block may have the coding format listed in Table 1. Coding formats of fields D1 to D3 in the OAM function block may include: a type field of 6 bits, indicating different OAM functions or a combination of several OAM functions; a value field of 14 bits, indicating message content of one or more specific types of OAM functions; and a CRC field of 4 bits, indicating that CRC-4 or CRC-8 check is performed on all 60 bits (except the 4 bits for CRC).

TABLE 1

| Bit [0 1] | Bit [2 ... 9] | Bit [10 ... 17] | Bit [18 ... 25] | Bit [26 ... 33] | Bit [34-37] | Bit [38-65] |
|---|---|---|---|---|---|---|
| Synchronization header | Type | D1 | D2 | D3 | O | C4~C7 |
| 1 0 | 0x4B | Type[0:5] + Value[0:1] | Value [2:9] | Value [10:13] + CRC [0:3] | 0x6 | 0x00 |

Figure 18A:
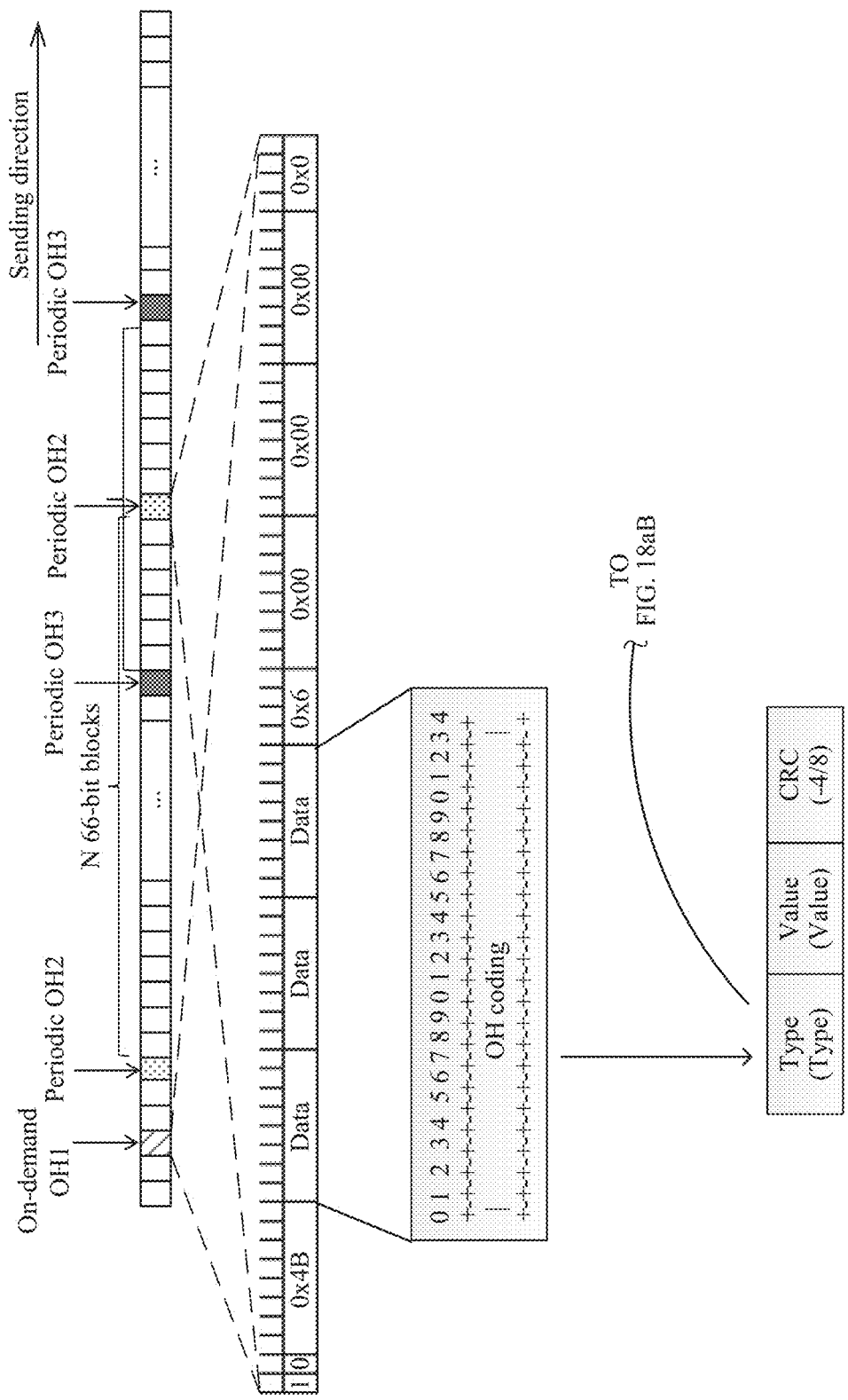
FIG. 18aA and FIG. 18aB, and FIG. 18bA and FIG. 18bB are two schematic diagrams of sending a plurality of OAM function blocks according to an embodiment of the present invention.

FIG. 18aA and FIG. 18aB are a schematic diagram of sending a plurality of OAM function blocks according to an embodiment of the present invention. As shown in FIG. 18aA and FIG. 18aB, data fields may be used to represent different OAM functions such as error detection (BIP), a remote error indication (REI), a client signal indication (CS), synchronization (SYNC), an alarm indication (AIS) at a service layer, a protection switching protocol (APS), and delay measurement (DM). When there are a plurality of OAM function blocks, the OAM function block may carry a type identifier (such as a type field of D1 in Table 1 or a type field in a table at a lower right corner of FIG. 18aB), to distinguish between different OAM function blocks. Similarly, the detection block in the foregoing embodiment may also carry the type identifier. The table at the lower right corner of the figure shows coding formats of the data fields in the plurality of OAM function blocks. In a bit block data flow in the figure, on-demand overhead (overhead, OH) 1 is an OAM function returned immediately on demand, such as an RDI, an REI, DM, and APS; and periodic OH2 and periodic OH3 are separately sent within respective periods, such as a CCB, BIP, a CS, and other OAM functions.

Figure 18B:
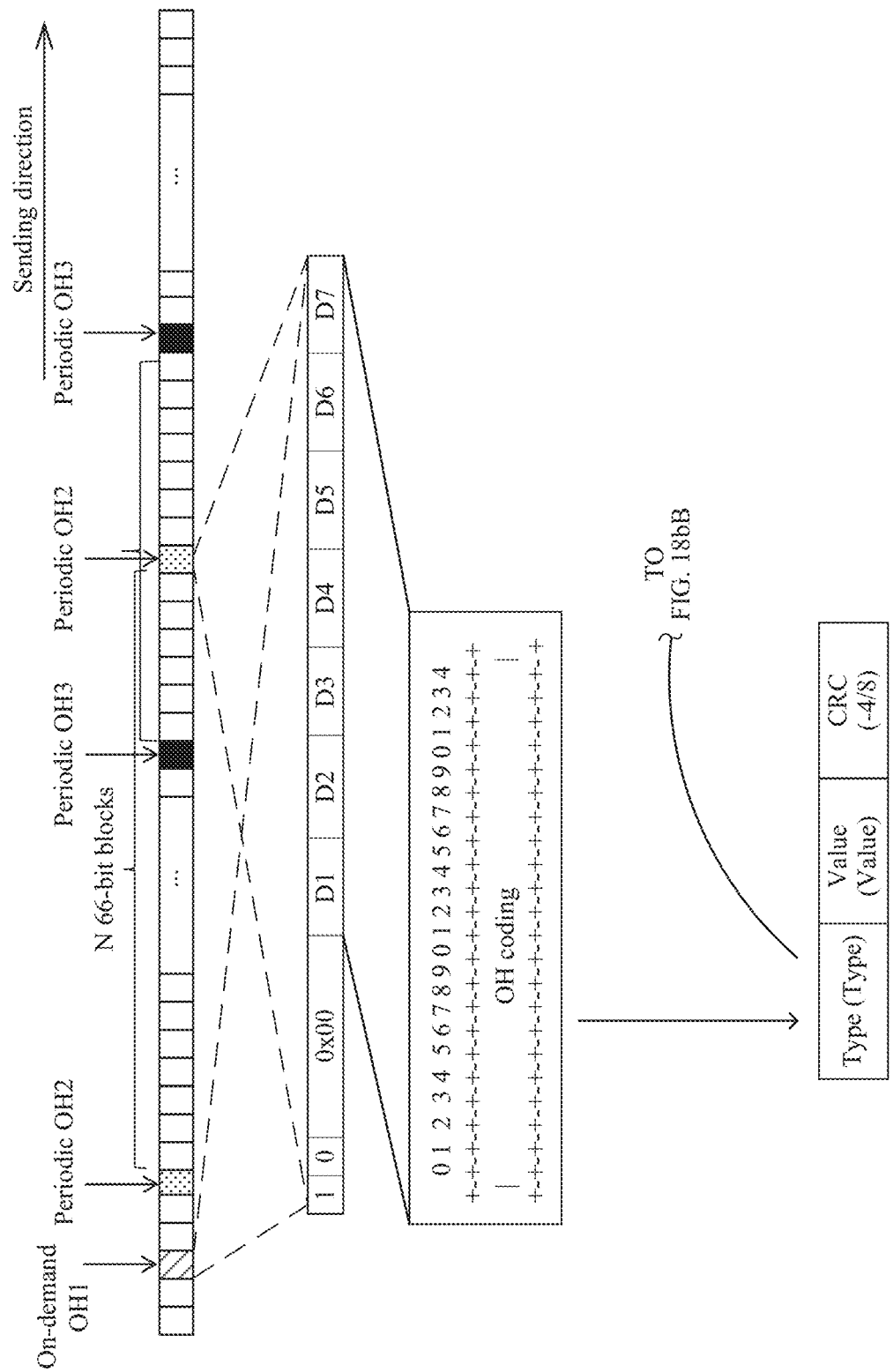

When a value field in Table 1 carries only a portion of the OAM function, the value field may be flexibly defined, and a plurality of OAM blocks are used for carrying. To be specific, each OAM function block carries only a portion of function information. As shown in a connectivity check/verification (CC/CV for short) field in the table in FIG. 18bB, when a flow identifier needs 64 bytes in length, a 14-bit value field of each detection block is divided into two parts: Value[0,5], indicating a sequence number: and Value [6,13], indicating one byte of the 64 bytes of the flow identifier, as shown in FIG. 7g. Similarly, for one-way delay measurement DM, namely, DM in the table, when D1[6:7] is 0x00 or 0x11, 12 bits of a time stamp is transferred each time, and a total of 8 frames are transferred.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (such as a DVD), a semiconductor medium (such as a Solid State Disk (SSD)), or the like.

What is claimed is:

1. A detection block sending method, wherein the method comprises:
   obtaining, by a network device, an original bit block data flow;
   generating at least one detection block;
   inserting the at least one detection block into a position of at least one idle block in the original bit block data flow, wherein the at least one detection block carries a preset reference sending period, and a sending period of the at least one detection block is greater than or equal to the preset reference sending period carried in the at least one detection block; and
   sending a bit block data flow comprising the at least one detection block.

2. The method according to claim 1, wherein the at least one detection block carries a flow identifier, and the flow identifier is used to indicate a connection identifier of the original bit block data flow.

3. The method according to claim 1, wherein the preset reference sending period is used to indicate a sending period of the at least one detection block.

4. The method according to claim 1, wherein when the sending period of the at least one detection block is greater than the preset reference sending period carried in the at least one detection block, the method further comprises:
   updating the preset reference sending period of the at least one detection block to the sending period of the at least one detection block.

5. The method according to claim 1, wherein different types of detection blocks have different type fields.

6. The method according to claim 1, wherein a piece of operation, administration, and maintenance (OAM) information is carried by at least two detection blocks.

7. The method according to claim 1, wherein the at least one detection block is an M/N bit block.

8. The method according to claim 1, wherein the network device is in a flexible Ethernet (FlexE).

9. A detection block receiving method, wherein the method comprises:
   receiving, by a network device, a bit block data flow comprising at least one detection block, wherein the at least one detection block carries a preset reference sending period, and a receiving period of the at least one detection block is greater than or equal to the preset reference sending period carried in the at least one detection block;
   identifying the at least one detection block;
   substituting at least one idle block for the at least one detection block; and
   sending a bit block data flow obtained after the at least one idle block is substituted.

10. The method according to claim 9, wherein the detection block carries a flow identifier, the flow identifier is used to indicate a connection identifier of the bit block data flow, and the method further comprises:
    performing, by the network device, fault detection based on the flow identifier.

11. The method according to claim 9, wherein the method further comprises:
    identifying, by the network device, the at least one detection block based on the reference sending period.

12. The method according to claim 9, wherein different types of detection blocks have different type fields.

13. The method according to claim 9, wherein a piece of operation, administration, and maintenance (OAM) information is carried by at least two detection blocks.

14. The method according to claim 9, wherein the at least one detection block is an M/N bit block.

15. The method according to claim 9, wherein the network device is in a flexible Ethernet (FlexE).

16. A network device, wherein the network device comprises:
    a receiver, configured to obtain an original bit block data flow;
    at least one processor;
    one or more memories coupled to the at least one processor and storing programming instructions for execution by the at least one processor to:
    generate at least one detection block; and
    insert the at least one detection block into a position of at least one idle block in the original bit block data flow, wherein the at least one detection block carries a preset reference sending period, and a sending period of the at least one detection block is greater than or equal to the preset reference sending period carried in the at least one detection block; and
    a transmitter, configured to send a bit block data flow comprising the at least one detection block.

17. The network device according to claim 16, wherein the at least one detection block carries a flow identifier, and the flow identifier is used to indicate a connection identifier of the original bit block data flow.

18. The network device according to claim 16, wherein the preset reference sending period is used to indicate a sending period of the at least one detection block.

19. The network device according to claim 16, wherein when the sending period of the at least one detection block is greater than the preset reference sending period carried in the at least one detection block, the one or more memory stores programming instructions for execution by the at least one processor to:
    update the preset reference sending period of the at least one detection block to the sending period of the at least one detection block.

20. The network device according to claim 16, wherein the at least one detection block is an M/N bit block.

* * * * *